March 29, 1966    R. J. TAPPEHORN    3,242,607
FIREARM FIRING MECHANISM, ESPECIALLY FOR REVOLVERS
Filed Oct. 12, 1964    10 Sheets-Sheet 1

*INVENTOR.*
ROY J. TAPPEHORN
BY Frank C. Leach jr.
HIS ATTORNEY

March 29, 1966    R. J. TAPPEHORN    3,242,607
FIREARM FIRING MECHANISM, ESPECIALLY FOR REVOLVERS
Filed Oct. 12, 1964    10 Sheets-Sheet 2

INVENTOR.
ROY J. TAPPEHORN
BY Frank C. Leach jr.
HIS ATTORNEY

March 29, 1966  R. J. TAPPEHORN  3,242,607
FIREARM FIRING MECHANISM, ESPECIALLY FOR REVOLVERS
Filed Oct. 12, 1964  10 Sheets-Sheet 3

INVENTOR.
ROY J. TAPPEHORN
BY Frank C. Leach jr.
HIS ATTORNEY

March 29, 1966   R. J. TAPPEHORN   3,242,607
FIREARM FIRING MECHANISM, ESPECIALLY FOR REVOLVERS
Filed Oct. 12, 1964   10 Sheets-Sheet 4

INVENTOR.
ROY J. TAPPEHORN
BY Frank C. Leach Jr.
HIS ATTORNEY

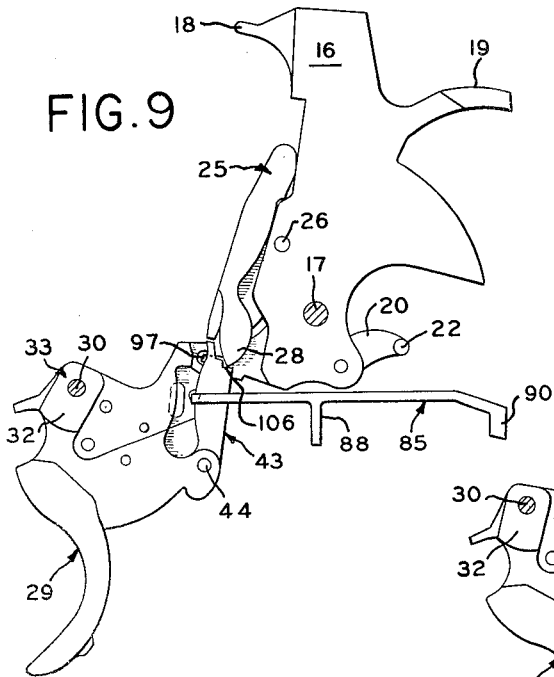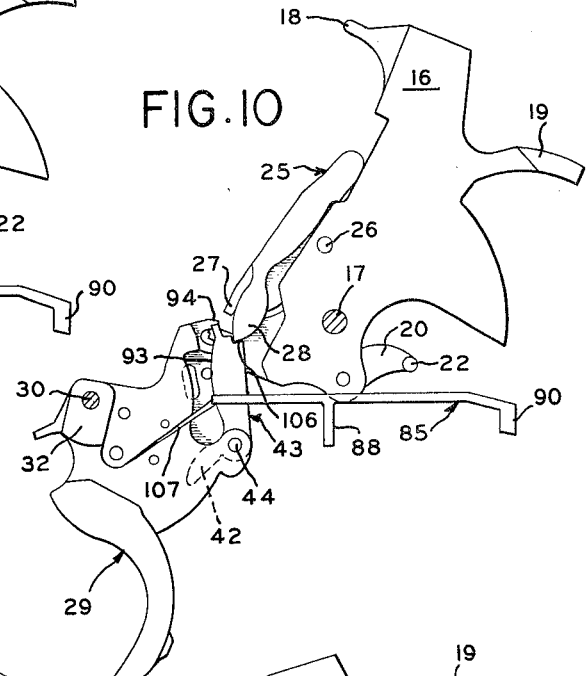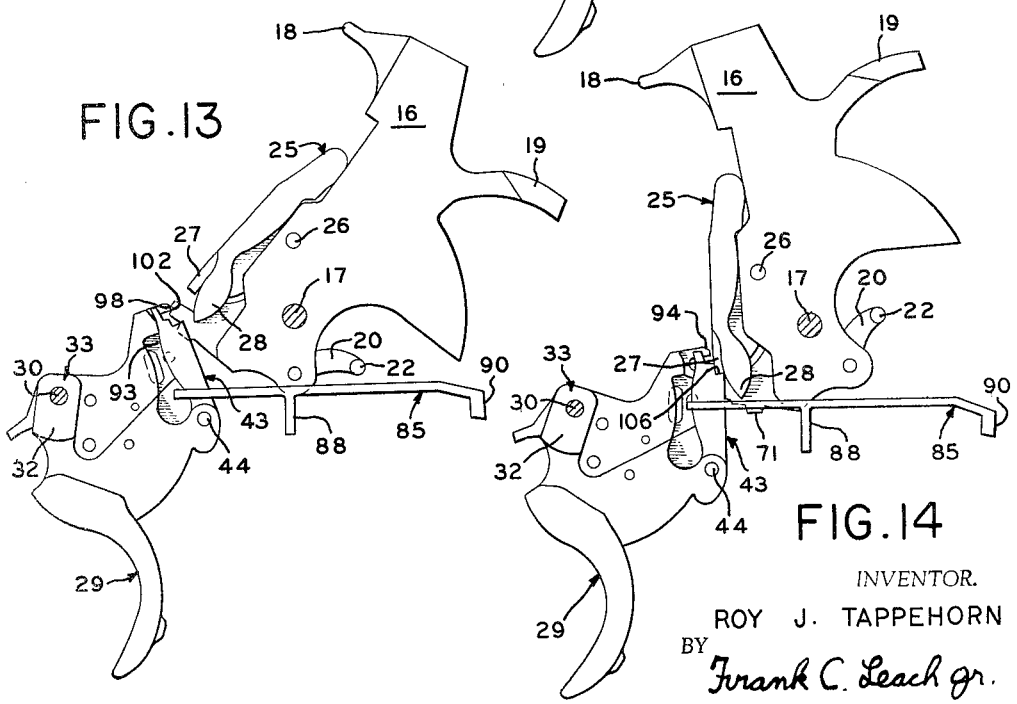

March 29, 1966 R. J. TAPPEHORN 3,242,607
FIREARM FIRING MECHANISM, ESPECIALLY FOR REVOLVERS
Filed Oct. 12, 1964 10 Sheets-Sheet 6

INVENTOR.
ROY J. TAPPEHORN
BY Frank C. Leach Jr.
HIS ATTORNEY

March 29, 1966 R. J. TAPPEHORN 3,242,607
FIREARM FIRING MECHANISM, ESPECIALLY FOR REVOLVERS
Filed Oct. 12, 1964 10 Sheets-Sheet 7
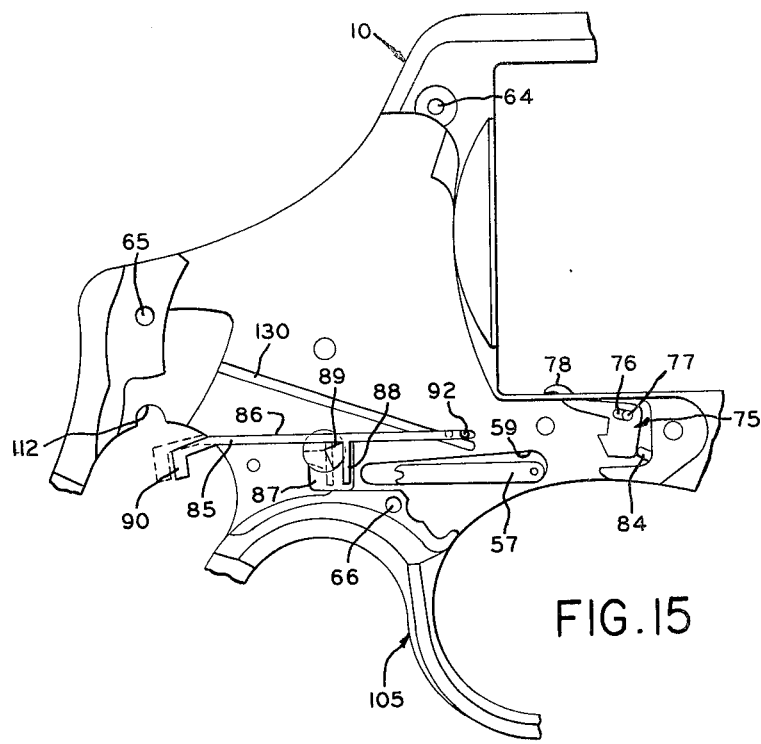
FIG. 15
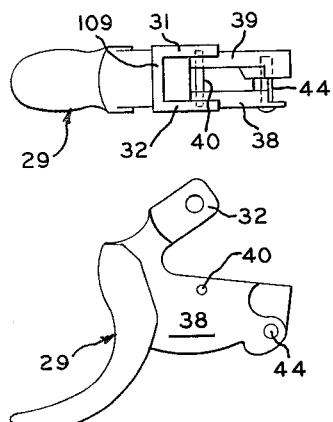
FIG. 19
FIG. 18
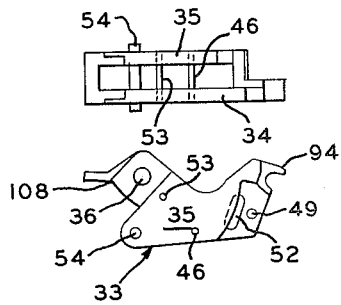
FIG. 21
FIG. 20
INVENTOR.
ROY J. TAPPEHORN
BY Frank C. Leach Jr.
HIS ATTORNEY

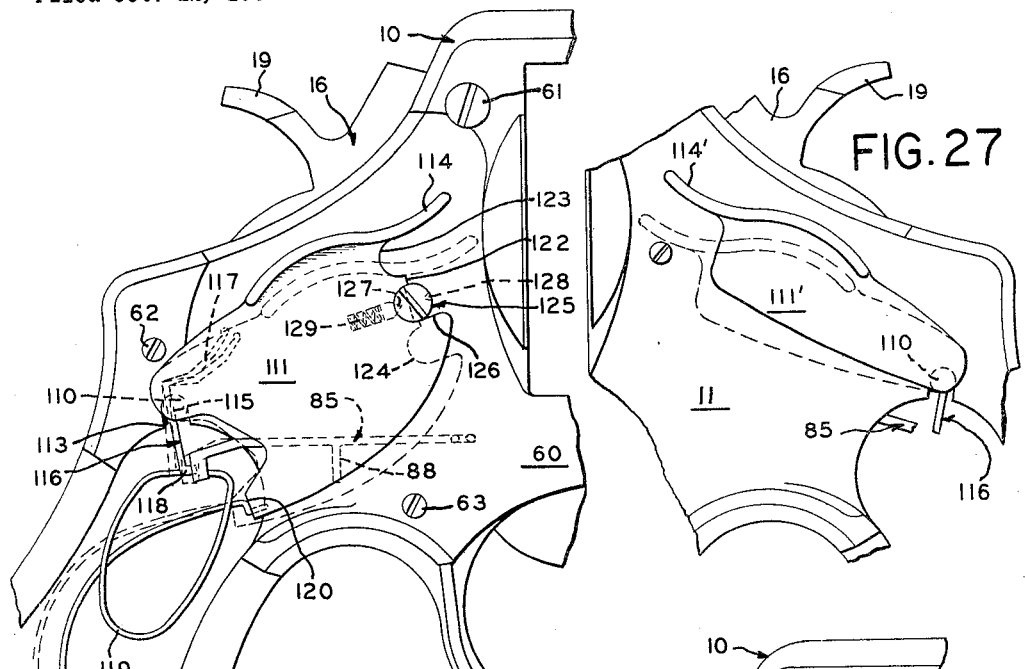
FIG. 27
FIG. 16
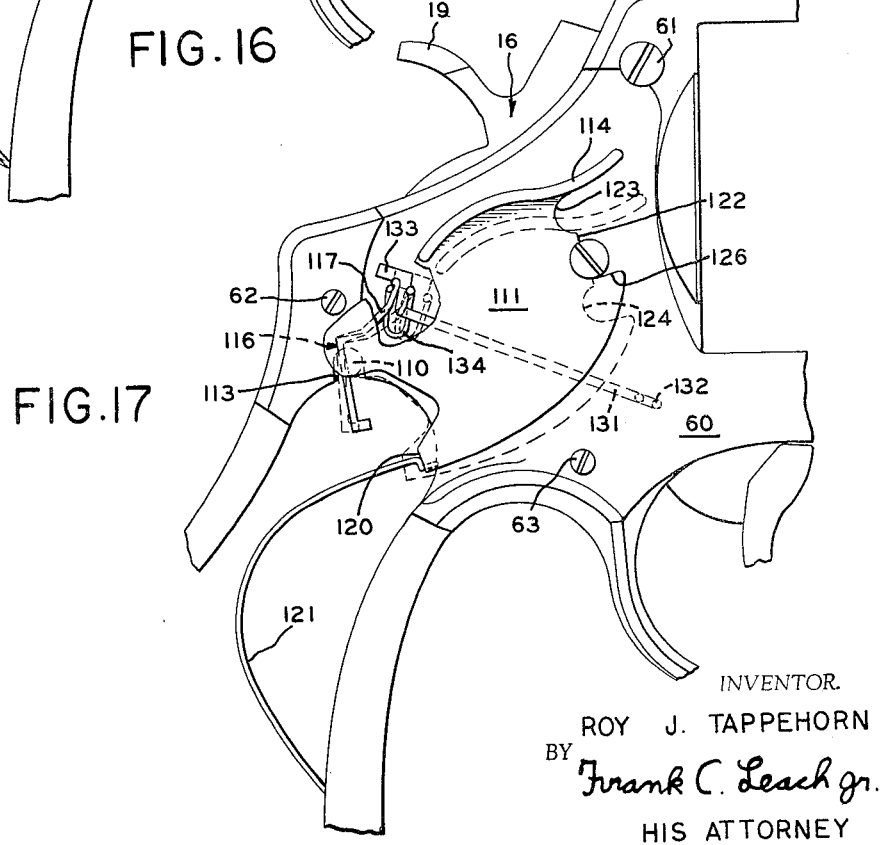
FIG. 17
INVENTOR.
ROY J. TAPPEHORN
BY Frank C. Leach Jr.
HIS ATTORNEY March 29, 1966  R. J. TAPPEHORN  3,242,607
FIREARM FIRING MECHANISM, ESPECIALLY FOR REVOLVERS
Filed Oct. 12, 1964  10 Sheets-Sheet 9

INVENTOR.
ROY J. TAPPEHORN
BY Frank C. Leach Jr.
HIS ATTORNEY

INVENTOR.
ROY J. TAPPEHORN
BY Frank C. Leach jr.
HIS ATTORNEY

United States Patent Office 3,242,607
Patented Mar. 29, 1966

3,242,607
FIREARM FIRING MECHANISM, ESPECIALLY
FOR REVOLVERS
Roy J. Tappehorn, 2536 Kings Highway,
Louisville, Ky.
Filed Oct. 12, 1964, Ser. No. 403,042
58 Claims. (Cl. 42—65)

This invention relates to a firearm mechanism and, more particularly, to a mechanism permitting the user of a firearm to select the manner in which the firearm is to be fired.

In many present firearms and particularly revolvers, one method of firing the revolver is to move the hammer manually to its set cock position. This is known as single action use. In the set cock position, the hammer is held back by a sear, which is a catch or support engaging a notch in the toe of the hammer, with the main hammer spring at or near its maximum tension.

The firearm is easily fired by a light trigger pull of two to four pounds when the hammer is in its set cock position. This light trigger pull results in the support of the sear being removed from the hammer toe to allow the main hammer spring to urge the hammer to its fired position. When in its set cock position, the firearm may be laid down free of the hand of the user with the hammer remaining supported in its set cock position by the sear.

The firing of a firearm by manually cocking the hammer permits accuracy because of the light trigger pull. However, rapid firing of the weapon is prevented because of the time consumed in moving the hammer to the set cock position by the thumb or hand of the user. This maneuver results in the user having to again assume the proper grip and sight alignment position. As a result, substantial time elapses before the gun can be fired again.

Some firearms and particularly revolvers have means permitting more rapid fire; this is known as double action. In double action, the hammer is moved rearwardly from its rest position by pressure on the trigger alone. Before the hammer reaches its set cock position and before the trigger reaches the rear limit of its travel such as by engaging the trigger guard, for example, the engagement between the trigger and the hammer ceases so that the hammer is moved to its fired position by its main spring.

A force of twelve to sixteen pounds must be exerted on the trigger when firing the weapon in double action. This greater pressure prevents accuracy in aiming. Thus, the firing of a firearm in double action is primarily used when firing at an object within a few feet of the user of the gun. Furthermore, the user of the gun does not know when the firearm will fire in double action; this also limits the accuracy.

When a firearm is used by a law enforcement officer, for example, it is a prerequisite that the firearm be capable of double action because the officer must be able to quickly fire the firearm in close quarters with criminals. In such a situation, it is not necessary to have sight aligned accuracy but only that the gun fires quickly. Likewise, it is necessary for the firearm to have single action capabilities when used by a law enforcement officer so that he may have more accurate aim by a light trigger pull when necessary.

However, neither the single action nor the double action will allow a law enforcement officer, for example, to obtain the optimum of both speed and accuracy when attempting to apprehend a fleeing criminal. If the officer attempts to use double action, the strong pull on the trigger reduces his accuracy. If the officer attempts to use single action firing of the firearm, he must cock the hammer manually; this results in loss of grip, time, and sight alignment, and this can be mostly costly.

The present invention satisfactorily solves the foregoing problems by providing a mechanism for a firearm in which the hammer may be moved to its set cock position by retraction of the trigger until further movement of the trigger is prevented by an unyielding stop and then releasing the trigger. The mechanism then permits firing of the firearm by a very light pull on the trigger of two to four pounds as is normally required in firing single action. This type of firing of the firearm will be called triple action. In firing triple action, the hammer is held in its set cock position by the same sear engaging in the same notch of the hammer toe as occurs when firing single action.

The present invention still permits the revolver to be fired in double action by a selection mechanism. Thus, the law enforcement officer may quickly select either double action or triple action firing of the firearm as needed. For example, the selection mechanism may be set so that the firearm will normally be available for double action firing and require the selection mechanism to be moved, which may be accomplished very rapidly, to its triple action position.

The present invention also allows the firearm to always be fired single action irrespective of whether the selection mechanism is in its double action or triple action position. Therefore, the law enforcement officer always has available single action firing of the firearm as well as his choice of double action or triple action.

While the mechanism of the present invention has been particularly pointed out with respect to its use in a firearm utilized by a law enforcement officer, it may be readily employed by others. For example, in rapid target firing, much greater accuracy and rapidity of fire will be obtained with the present invention by placing the selection mechanism in its triple action position than is available in present firearms.

An object of this invention is to provide a firearm that may always be fired single action by setting the hammer manually and either double action or triple action.

Another object of this invention is to provide a firearm having a separate sear and trigger that function as a unitary assembly except when the firearm is positioned for firing in triple action.

A further object of this invention is to provide a mechanism for a firearm in which the hammer is moved to its set cock position by instant retraction of the trigger until an unyielding stop prevents movement and then releasing the trigger.

Other objects of this invention will be readily perceived from the following description.

The attached drawings illustrate preferred embodiments of the invention, in which FIGURE 1 is a side elevation view of a firearm, taken from the right hand side, including the mechanism of the present invention in its double action position with the side plate and the grip plates removed and the hammer in its rest position;

FIGURE 9 is a side elevational view, similar to FIGURE 8, of a portion of the structure of FIGURE 7 but showing the hammer retracted slightly from its rest position of FIGURES 7 and 8;

FIGURE 10 is a side elevational view, similar to FIGURE 9, of a portion of the structure of FIGURE 7 with the hammer retracted further from its rest position by movement of the trigger;

FIGURE 13 is a side elevational view, similar to FIGURE 11, of a portion of the structure of FIGURE 7 with the trigger having been released and the hammer held in its set cock position;

FIGURE 14 is a side elevational view, taken from the left hand side, of a portion of the structure of FIGURE 12 and showing the hammer in its fired position and the trigger returning towards its rest position;

FIGURE 15 is a side elevational view, taken from the right hand side, of a portion of the frame of the firearm of the present invention;

FIGURE 16 is a side elevational view, taken from the right hand side, of a portion of the firearm of the present invention with the side plate mounted thereon and showing another form of selection mechanism;

FIGURE 17 is a side elevational view, taken from the right hand side, of a portion of the firearm of the present invention with the side plate mounted thereon and showing a further embodiment of the selection mechanism;

FIGURE 18 is a side elevational view, taken from the left hand side, of the trigger of the present invention;

FIGURE 19 is a top plan view of the trigger of FIGURE 18;

FIGURE 20 is a side elevational view, taken from the left hand side, of the sear of the present invention;

FIGURE 21 is a bottom plan view of the sear of FIGURE 20;

FIGURE 27 is a side elevational view, taken from the left hand side, of a portion of the structure of FIGURE 16.

Figure 1:
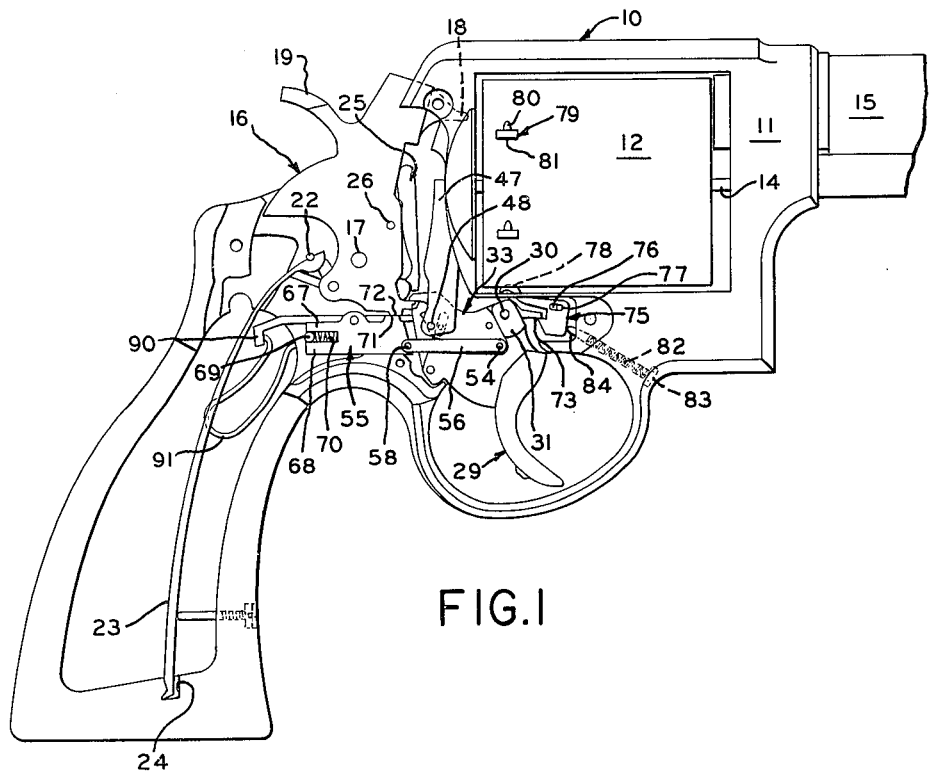
Figure 2:
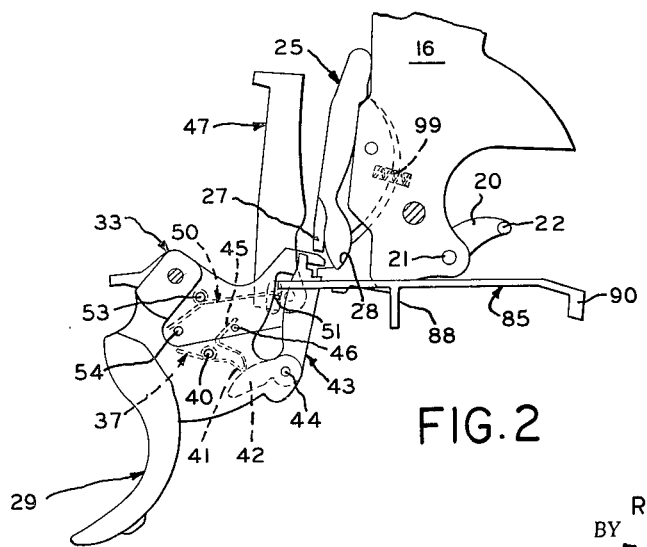
FIGURE 2 is a side elevational view of a portion of the structure of FIGURE 1 and taken from the left hand side.

Referring to the drawings and particularly FIGURES 1 and 2, there is shown a firearm 10, which is a revolver. The firearm 10 includes a frame 11 having a removable revolving cylinder 12 mounted therein on a pivot pin 14 for revolving about the axis of the pivot pin 14. A barrel 15 is threadedly attached to one end of the frame by threads on its exterior cooperating with threads on the interior of the frame 11.

A hammer 16 is pivotally mounted on a stud 17 of the frame 11. The hammer 16 has a firing pin 18, which is adapted to strike the primers of cartridges disposed within the revolving cylinder 12 to produce ignition thereof in the well-known manner. The hammer 16 has a thumb spur 19 to permit grasping of the hammer 16 for manual movement thereof.

The hammer 16 has a stirrup 20 pivotally attached thereto by a pin 21. The free end of the stirrup 20 has a pin 22 projecting from opposite sides thereof for cooperation with bifurcated ends of a main hammer spring 23. The lower end of the spring 23 is retained within a groove 24 in the bottom of the frame 11 whereby the spring 23 is always urging the hammer 16 to pivot about the stud 17 to its fired position.

A strut or lifter 25 is pivotally mounted on the front end of the hammer 16 by a pin 26. The strut has a short portion 27 and a long projection 28 disposed in separate and parallel vertical planes. As shown in FIGURE 2, the short portion 27 is disposed a greater radial distance from the axis of the pivot stud 17 than the long projection 28.

A trigger 29 is pivotally mounted on a stud 30 of the frame 11 by a pair of spaced projecting apertured lugs 31 and 32 (see FIGURES 1, 18, and 19). Prior to mounting the trigger 29 on the stud 30, a sear 33, which has a pair of spaced walls 34 and 35 (see FIGURE 21), is disposed between the lugs 31 and 32 to allow the sear 33 to also be pivotally mounted on the stud 30. The wall 35 of the sear 33 has an aperture 36 to fit over the stud 30. The wall 34 of the sear 33 has an aperture (not shown) similar to the aperture 36 in the wall 35 for cooperation with the stud 30. Thus, the trigger 29 and the sear 33 are adapted to pivot about the same axis, which is the stud 30.

The sear 33 and the trigger 29 are normally held in contact with each other to function as a unitary member by a spring 37 (see FIGURE 2). The spring 37 is disposed between spaced walls 38 and 39 of the trigger 29 (see FIGURE 19) and the spaced walls 34 and 35 of the sear 33. The spring 37 is mounted on a removable pin 40 extending through the trigger 29. The spring 37 has a portion 41 acting against a toe 42 of a pawl 43. The pawl 43 is pivotally mounted on the trigger 29 by a pin 44. An end 45 of the spring 37 bears against a pin 46, which extends between and into the spaced walls 34 and 35 of the sear 33. The end 45 of the spring 37 is disposed between the spaced walls 34 and 35 of the sear 33.

Thus, the spring 37 urges the sear 33 and the trigger 29 together by acting against the pin 46. However, relative movement between the trigger 29 and the sear 33 may occur when the force of the spring 37 is overcome by movement of the pawl 43 as will be explained hereinafter.

A cylinder pawl 47 is pivotally mounted on the sear 33 through a pin 48 on the pawl 47 extending into an aperture 49 (see FIGURES 3 and 20) in the spaced wall 34 of the sear 33. The cylinder pawl 47 cooperates with a cylinder ratchet (not shown), which is attached to the revolving cylinder 12, for revolving the cylinder 12 about the longitudinal axis of the pin 14 in the well-known manner.

The pawl 47 is held in engagement with the cylinder ratchet (not shown) by one end of a spring 50, which is disposed between the spaced walls 34 and 35 of the sear 33, acting on a pin 51 of the pawl 47. The pin 51 rides in a slot 52 in the wall 34 of the sear 33 to permit the necessary relative movement between the cylinder pawl 47 and the sear 33 when the sear 33 pivots about the stud 30.

The spring 50 is mounted on a pin 53, which extends between and into the spaced walls 34 and 35 of the sear 33. The other end of the spring 50 bears against the top of a pin 54, which projects from opposite sides of the sear 33 (see FIGURE 21).

A rebound slide 55 is attached to the sear 33 through a pair of connecting rods 56 and 57 (see FIGURES 1 and 15). One end of each of the connecting rods 56 and 57 has an aperture therein for fitting over the ends of the projecting pin 54 of the sear 33. The other end of the rod 56 has an aperture therein for fitting over a pin 58, which projects from both sides of the rebound slide 55. The other end of the connecting rod 57 does not have an aperture therein but is open ended (see FIGURE 15) to fit around the projection of the pin 58. This is desirable in order to permit easy assembly of the structure.

As shown in FIGURE 15, the frame 11 has a groove 59 for reception of the connecting rod 57. A similar groove (not shown) is disposed in a side plate 60, which is adapted to be attached to the frame 11 by suitable means such as screws 61, 62, and 63 (see FIGURE 16) disposed in threaded openings 64, 65, and 66 (see FIGURE 15), respectively, in the frame 11.

The rebound slide 55 has bifurcated ends 67 and 68 fitting on opposite sides of a stud 69, which projects from the frame 11. The slide 55 has a passage of circular cross section extending therethrough with a coil spring 70 disposed therein. One end of the spring 70 is retained within the passage of the slide 55 by a blind end of the circular cross sectional passage while the other end of the spring 70 is retained within the passage of the slide 55 by the stud 69. The spring 70 constantly urges the sear 33 and the trigger 29 to pivot in a counter-clockwise direction (as viewed in FIGURE 1) about the stud 30.

The rebound slide 55 has a shoulder 71 for cooperating with a shoulder 72 on the hammer 16. After the gun has been fired, the shoulder 71 engages the shoulder 72 of the hammer 16 to move the hammer 16 from its fired position to its rest position in the well-known manner through the force of the spring 70 as the trigger 29 returns to its rest position. The primary purpose of rebound in either a double action or triple action revolver is to automatically insure that the firing pin does not rest against the primer of a live cartridge when the uncocked hammer is in line with a live cartridge.

The sear 33 has a projection 73 extending therefrom for disposition in a slot 74 of a cylinder stop 75. The cylinder stop 75 has a large slot 76 adapted to fit over a stud 77 of the frame 11 to permit pivotal and sliding movement of the cylinder stop 75 about the stud 77. The stop 75 has a lug 78, which extends into one of a plurality of cooperating recesses 79 in the revolving cylinder 12 to hold the revolving cylinder 12 in position when the gun is fired. The lug 78 remains within the receptacle or recess 79 of the revolving cylinder 12 until the trigger 29 is again actuated.

It should be understood that the revolving cylinder 12 has a recess 79 for each of its bullets or cartridges in the well-known manner. Each of these recesses 79 has a shallow entrance portion 80 with a cambered surface leading to a larger portion 81 of the recess 79 as now employed in Smith and Wesson .38 military and police revolvers, for example.

A spring 82 is disposed within a slot or hole in the frame 11 to always exert pressure on the stop 75 to urge the lug 78 into engagement with the recess 79 in the revolving cylinder 12. The spring 82 is held within the slot on the frame 11 by a screw 83 and acts on the stop 75 through a plunger 84.

One form of a selection mechanism, which determines the position of the pawl 43, is shown in FIGURE 15. The selection mechanism includes a link 85, which is disposed in a groove 86 in the frame 11. The groove 86 has an enlarged slot or recess 87 in the frame 11 and disposed at a substantially right angle to the longitudinal axis of the groove 86. A projection 88 extends from the link 85 about midway of its length and is disposed within the recess 87. The frame 11 has a recess extending from the recess 87 to the exterior of the frame 11 for reception of a wedge member 89, which engages the projection 88.

The wedge member 89 has a shoulder on one end for cooperation with a shoulder at the exterior of the recess to retain the wedge member 89 within the frame 11. It should be understood that the wedge member 89 is inserted in the recess when the firearm 10 is being assembled.

One end of the link 85 has a projection 90 with an opening or aperture in the end thereof. A compression spring 91 (see FIGURE 1) has one end disposed within the aperture in the projection 90 and the other end disposed within an aperture in the frame 11. The force of the compression spring 91 always urges the link 85 rearwardly.

The other end of the link 85 has a hook 92 extending at a substantially right angle to the frame 11. The hook 92 is disposed within cut out portions of the sear 33 and the trigger 29. With the wedge member 89 in one of its positions in which one of its faces contacts the projection 88, the hook 92 does not engage the pawl 43 so that there is no relative movement of the pawl 43 with respect to the trigger 29.

However, when the wedge member 89 is disposed in a second position in which another of its faces engages the projection 88, the link 85 is moved further rearwardly due to the force of the compression spring 91 and the hook 92 engages against a contact face 93 of the pawl 43. When in this latter position in which the hook 92 engages the contact face 93 of the pawl 43, triple action firing of the firearm is available.

The operation of the present invention will first be discussed with respect to the wedge member 89 of the selection mechanism positioned so that the hook 92 of the link 85 is disposed within the cut out portion of the sear 33 rather than engaging against the contact face 93 of the pawl 43. In this position of the link 85, the revolver 10 may either be fired single action or double action.

Considering firing of the revolver 10 in double action, the trigger 29 is actuated by pulling rearwardly thereon. This results in the trigger 29 and the sear 33 rotating in the same direction about the pivot stud 30. As the trigger 29 and the sear 33 are rotated, the projection 73 of the sear 33 pivots the cylinder stop 75 about the stud 77 against the force of the spring 82 to remove the lug 78 from engagement with the recess 79 in the revolving cylinder 12. This permits the cylinder pawl 47 to begin rotation of the cylinder 12 about the pivot pin 14 through engagement with the cylinder ratchet (not shown) on the revolving cylinder 12.

The actuation of the trigger 29 and the sear 33 about the stud 30 also causes a contact face 94 (see FIGURE 4) of the sear 33 to engage the short portion 27 of the strut 25, which is pivotally secured to the hammer 16 through the pin 26. This causes the hammer 16 to pivot about the stud 17 away from its rest position. The force of the spring 37 acting on the toe 42 of the pawl 43 prevents the pawl 43 from engaging the long projection 28 of the strut 25 as the trigger 29 and the sear 33 are actuated.

Figure 3:
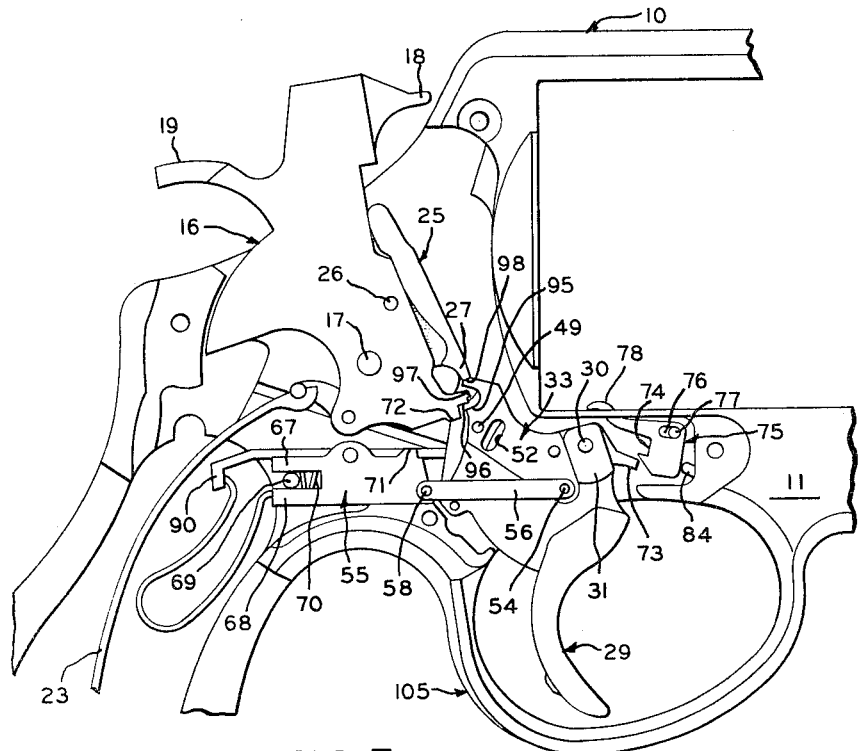
FIGURE 3 is a side elevational view, similar to FIGURE 1, of a firearm including the mechanism of the present invention in its double action position with the hammer disposed in a partially rotated position from its rest position of FIGURE 1 and the cylinder and the cylinder pawl removed.
Figure 4:
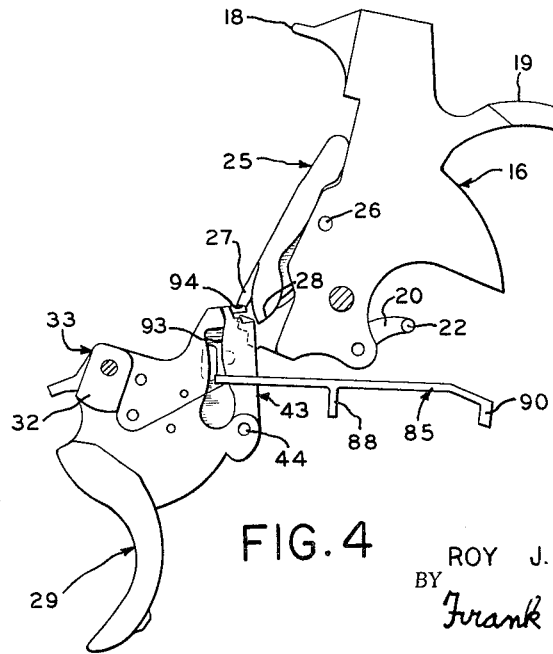
FIGURE 4 is a side elevational view of a portion of the structure of FIGURE 3 and taken from the left hand side.

Referring to FIGURES 3 and 4, the continued actuation of the trigger 29 has moved the projection 73 of the sear 33 out of the slot 74 in the cylinder stop 75. As a result, the cylinder stop 75 has its lug 78 moved by the force of the spring 82 into the shallow portion 80 of the recess 79 for the next bullet chamber of the revolving cylinder 12.

In the position of FIGURES 3 and 4, the contact face 94 of the sear 33 is still in engagement with the short portion 27 of the strut 25. The force of the spring 37 is sufficient to maintain the pawl 43 out of engagement with the long projection 28 of the strut 25.

The rearward movement of the trigger 29 also causes the coil spring 70 in the rebound slide 55 to be compressed as the bifurcated ends 67 and 68 slide over the stud 69. The fitting of the bifurcated ends 67 and 68 of the slide 55 over the stud 69 insures that the slide 55 moves in a rearward longitudinal direction notwithstanding the pivotal movement of the sear 33 and the trigger 29 about the stud 30. The connecting rods 56 and 57 permit the sear 33 and the trigger 29 to rotate while the slide 55 moves rearwardly.

By the time that the sear 33 has advanced to the position shown in FIGURE 3, the cylinder pawl 47 has advanced the revolving cylinder 12 so that its next chamber is available for alignment with the firing pin 18 of the hammer 16. The lug 78 of the cylinder stop 75 is now disposed within the larger portion 81 of the recess 79 in the cylinder 12 to retain it in position.

A slight further actuation of the trigger 29 by rotating it about the stud 30 results in the contact face 94 of the sear 33 riding beyond the short portion 27 of the strut 25. Just prior to the face 94 of the sear 33 clearing the short portion 27 of the strut 25, a hip 95 of the sear 33 contacts an underside 96 of a toe 97 of the hammer 16. After the face 94 of the sear 33 clears the short portion 27 of the strut 25, a slight further actuation of the trigger 29 causes the hip 95 of the sear 33 to continue to rotate the hammer 16 until the hip 95 clears the toe 97 of the hammer 16. As soon as the hip 95 clears the toe 97 of the hammer 16, the main hammer spring 23 immediately forces the hammer 16 to its fired position wherein the firing pin 18 engages against a primer of a cartridge in one of the chambers of the revolving cylinder 12 to fire the firearm 10.

After the firearm 10 fires, the trigger 29 is released and tends to return to its rest position through the force of the coil spring 70 in the rebound slide 55 acting through the sear 33. However, since the contact face 94 of the sear 33 and a toe 98 of the sear 33 progressed upwardly beyond the short portion 27 of the strut 25 just prior to firing of the gun, the contact face 94 and the toe 98 of the sear 33 must now pass downwardly past the short portion 27 of the strut 25.

This movement of the contact face 94 and the toe 98 of the sear 33 downwardly past the short portion 27 of the strut 25 is accomplished by moving the lower portion of the strut 25 inwardly against a spring 99 (see FIGURE 2), which is constantly urging the lower end of the strut 25 outwardly about the pivot pin 26. This moves the top of the strut 25 away from contact with the hammer 16.

As soon as the trigger 29 is released after firing of the gun, the force of the coil spring 70 is sufficient to advance the hammer 16 slightly away from its fired position to its rebound or rest position through the shoulder 71 acting on the shoulder 72 of the hammer 16. The force of the coil spring 70 is sufficient to return the trigger 29 to rest through movement of the sear 33 by the connecting rods 56 and 57. This results in the trigger 29 again being positioned as shown in FIGURE 1; this is the rest position of both the trigger 29 and the hammer 16.

The pawl 43 avoided contact with the long projection 28 of the strut 25 when the trigger 29 was returned to its rest position. This is because the spring 37 exerts sufficient force on the toe 42 of the pawl 43 to maintain the pawl 43 out of contact with the long projection 28 of the strut 25. Because of the cut out portions in the trigger 29 and the sear 33, the hook 92 of the link 85 of the selection mechanism does not touch the pawl 43 at any time during the entire firing operation when the selection mechanism is in its double action position.

Figure 5:
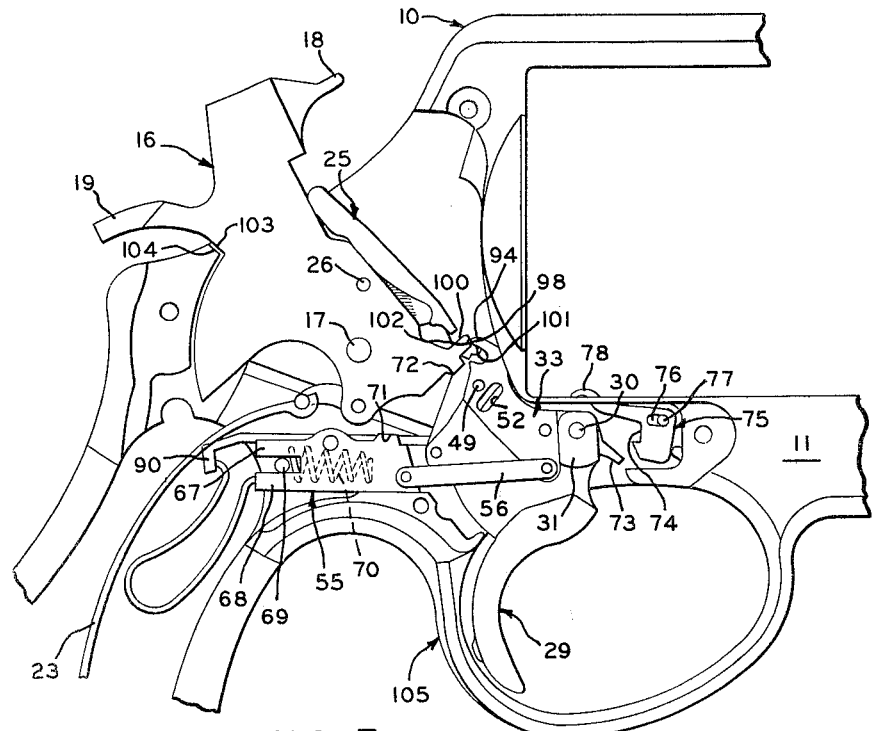
FIGURE 5 is a side elevational view, similar to FIGURE 1, of the firearm including the mechanism of the present invention in its double action position with the hammer in its set cock position and taken from the right hand side and the cylinder and the cylinder pawl removed.
Figure 6:
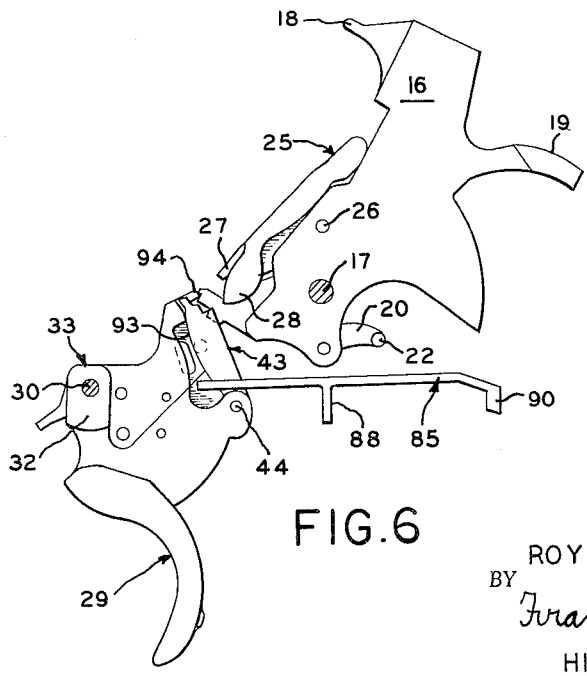
FIGURE 6 is a side elevation view of a portion of the structure of FIGURE 5 and taken from the left hand side.

Referring to FIGURES 5 and 6, the hammer 16 is shown in its set cock position. It should be understood that the hammer 16 can reach this set cock position of FIGURES 5 and 6 when the selection mechanism is in its double action position only by manual operation. Thus, it is necessary to grasp the thumb spur 19 to move the hammer 16.

With the hammer 16 in its rest position of FIGURES 1 and 2, grasping of the thumb spur 19 causes the hammer 16 to pivot about the stud 17. When the hammer 16 pivots about the stud 17, the toe 97 of the hammer 16 has an upper portion 100 moves into contact with bottom 101 of the portion of the sear 33 having the contact face 94 on its top thereof. This results in the trigger 29 and the sear 33 moving about the pivot stud 30 to compress the spring 70 within the rebound slide 55 by moving the rebound slide 55 rearwardly. As shown in FIGURE 5, the bifurcated ends 67 and 68 of the slide 55 have moved over the stud 69 to cause substantial compression of the spring 70.

Continued rotation of the hammer 16 about the stud 17 results in the upper portion 100 of the toe 97 passing beyond the bottom 101 of the sear 33. The sear 33 then rides on the face of the toe 97 of the hammer 16 until the toe 98 of the sear 33 drops into a notch 102 in the toe 97 as a portion 103 of the hammer engages a portion 104 of the frame 11 at the maximum rearward position of the hammer 16 and the hammer 16 then is released. This is a very slight movement of the notch 102 into engagement with the toe 98, which is the furthermost point of the bottom 101 of the sear 33, when the hammer 16 is released after the portions 103 and 104 engage. With the notch 102 of the hammer 16 engaged by the toe 98 of the sear 33, the trigger 29 is positioned slightly forward of the rear of trigger guard 105 of the frame 11 (see FIGURE 5).

As shown in FIGURE 6, the pawl 43 completely clears the long projection 28 of the strut 25 when the hammer 16 is manually moved to its set cock position. Of course, since the movement of the trigger 29 and the sear 33 was by actuation of the hammer 16, there is no contact between the sear 33 and the short portion 27 of the strut 25. Furthermore, during this movement, the cut out portions of the sear 33 and the trigger 29 moved upwardly with respect to the hook 92 of the link 85 of the selection mechanism but did not touch the hook 92.

It should be observed that pivotal movement of the trigger 29 and the sear 33 by the hammer 16 also results in the portion 73 of the sear 33 moving out of the slot 74 of the cylinder stop 75 after it had moved the cylinder stop 75 about the pin 77 sufficiently to remove the lug 78 from engagement with the recess 79 in the revolving cylinder 12. This permits the revolving cylinder 12 to be moved about the axis of the pivot pin 14 by the cylinder pawl 47 engaging the cylinder ratchet (not shown) of the revolving cylinder 12. The cylinder pawl 47 is actuated to revolve the cylinder 12 because it is pivotally attached to the sear 33 and moves therewith.

After the portion 73 moves out of the slot 74 of the cylinder stop 75, the force of the spring 82 moves the lug 78 into the receptacle 79 for the next chamber of the cylinder 12. Each of the receptacles 79 is slightly cambered to permit continued movement of the revolving cylinder 12 until it reaches the position in which the bullet in the next chamber will be in line with the firing pin 18 of the hammer 16.

With the hammer 16 in the position of FIGURES 5 and 6, it is only necessary to exert a small amount of pressure on the trigger 29 to cause the hammer 16 to fire. This is because a slight upwardly movement of the rear 33 removes the sear toe 98 from engagement with the notch 102 in the hammer toe 97 to allow the main spring 23 to urge the hammer 16 to its fired position.

After firing the gun, the trigger 29 is released and the coil spring 70 tends to move the trigger 29 to its rest position through acting on the sear 33. As the rebound slide 55 moves forwardly to return the trigger 29 to its rest position, the shoulder 71 on the slide 55 engages the shoulder 72 of the hammer 16 to move the hammer 16 from its fired position to its rebound or rest position of FIGURE 1. Because of the length of the slot 76 in the cylinder stop 75 and the cambered surface of the stop 75 against which the projection 73 of the sear 33 bears, the projection 73 of the sear 33 is able to ride into the slot 74 as the trigger 29 returns to its rest position. This occurs without the lug 78 of the cylinder stop 75 moving out of the receptacle 79 within the revolving cylinder 12.

Figure 7:
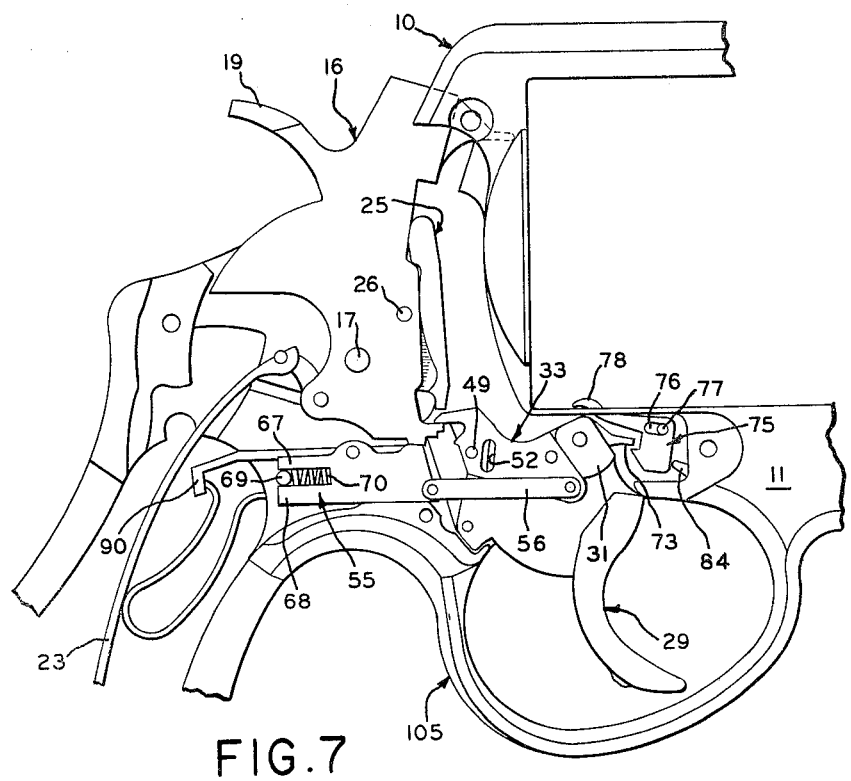
FIGURE 7 is a side elevational view of the firearm, taken from the right hand side, including the mechanism of the present invention in its triple action position with the side plate, the grip plates, the cylinder, and the cylinder pawl removed and the hammer in its rest position.
Figure 8:
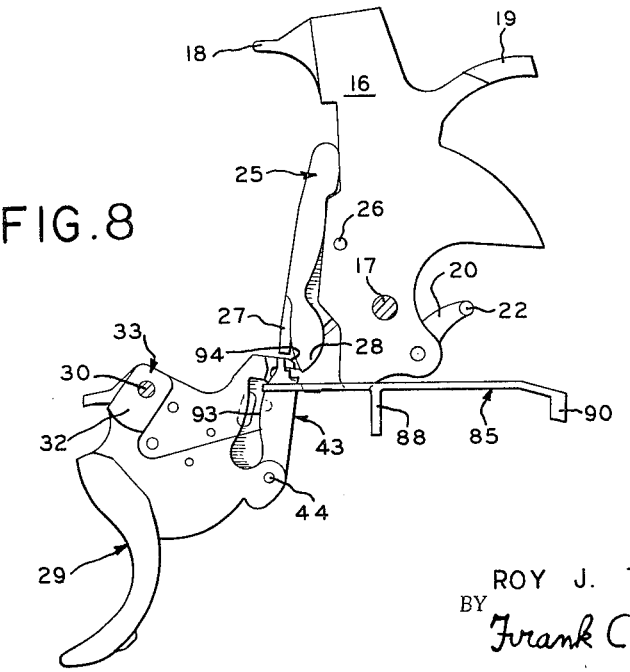
FIGURE 8 is a side elevational view, taken from the left hand side, of a portion of the structure of FIGURE 7.

When it is desired to fire the gun 10 by triple action, the wedge member 89 is rotated by a screw driver or the like inserted into a slot in the exterior of the wedge member 89 to the position (dotted line position of FIGURE 15) wherein the hook 92 of the link 85 engages the contact face 93 of the pawl 43 as shown in FIGURES 7 and 8. The hammer 16 is shown in its rest position in FIGURES 7 and 8.

With the hook 92 of the link 85 engaging the contact face 93 of the pawl 43, the pawl 43 is moved clockwise (as viewed in FIGURE 8) about the pin 44 to overcome the force of the spring 37 acting on the toe 42 of the pawl 43. When the force of the spring 37 is overcome, the end 45 of the spring 37 no longer acts against the pin 46 of the sear 33. As a result, the trigger 29 and the sear 33 may move relative to each other when the force of the spring 37 is overcome.

With the link 85 disposed in its triple action position, actuation of the trigger 29 causes the contact face 94 of the sear 33 to engage the short portion 27 of the strut 25 to begin movement of the hammer 16 about the stud 17 against the force of the main hammer spring 23. As the hammer 16 rotates about the stud 17, the long projection 28 of the strut 25 is moved to the position of FIGURE 9 wherein it may be engaged by a top surface 106 of the pawl 43.

The radial distance of the long projection 28 of the strut 25 from the hammer pivot stud 17 is less than the radial distance of the short portion 27 of the strut 25 from the stud 17. Thus, a greater angular velocity is imparted to the hammer 16 when the long projection 28 of the strut 25 is engaged by a member moving at the same linear velocity as a member engaging the short portion 27 of the strut 25. Therefore, the axis of the pivot pin 44 is positioned from the axis of the pivot stud 30 so that the hammer 16 has a greater angular movement per angular degree of rotation of the trigger 29 when the top surface 106 of the pawl 43 contacts the long projection 28 of the strut 25 than when the contact face 94 of the sear 33 engaged the short portion 27 of the strut 25.

As a result, the same amount of angular movement of the trigger 29 about the stud 30 will result in a greater movement of the hammer 16. This allows the hammer 16 to be moved to its set cock position by the trigger 29 through substantially the same rotational movement of the trigger 29 as when the trigger 29 is moved with the link 85 disposed in its double action position.

After the top surface 106 of the pawl 43 engages with the long projection 28 of the strut 25, the force of the hammer spring 23 is sufficient to hold the pawl 43 in engagement with the long projection 28 of the strut 25. In order to insure this engagement, the top surface 106 of the pawl 43 is formed with a negative rake of about five degrees. Soon after this contact between the pawl 43 and the long projection 28 of the strut 25, the hook 92 of the link 85 ceases to engage the contact face 93 of the pawl 43 due to an indentation in the pawl 43 and rests freely in the cut out portions of the sear 33 and the trigger 29.

As the hammer 16 is rotated from the position of FIGURE 9 to the position of FIGURE 10 by continued actuation of the trigger 29, the upper portion 100 of the toe 97 of the hammer 16 engages with the bottom 101 of the sear 33. This results in the sear 33 rotating at a greater angular velocity about the pivot stud 30 than the trigger 29.

Thus, the force of the spring 37 is overcome by the movement of the sear 33 by the hammer 16 so that a gap 107 (see FIGURE 10) occurs between the trigger 29 and the sear 33. If the sear 33 were not separable from the trigger 29, a jam would occur when the upper portion 100 of the hammer toe 97 contacts the bottom 101 of the sear 33.

The gap 107 also is necessary to permit the toe 97 of the hammer 16 to eventually pass above the contact face 94 of the sear 33. Furthermore, the force exerted by the hammer spring 23 through the toe 42 of the pawl 43 moves the spring 37 from contact with the pin 46 of the sear 33 (see FIGURE 11).

Figure 12:
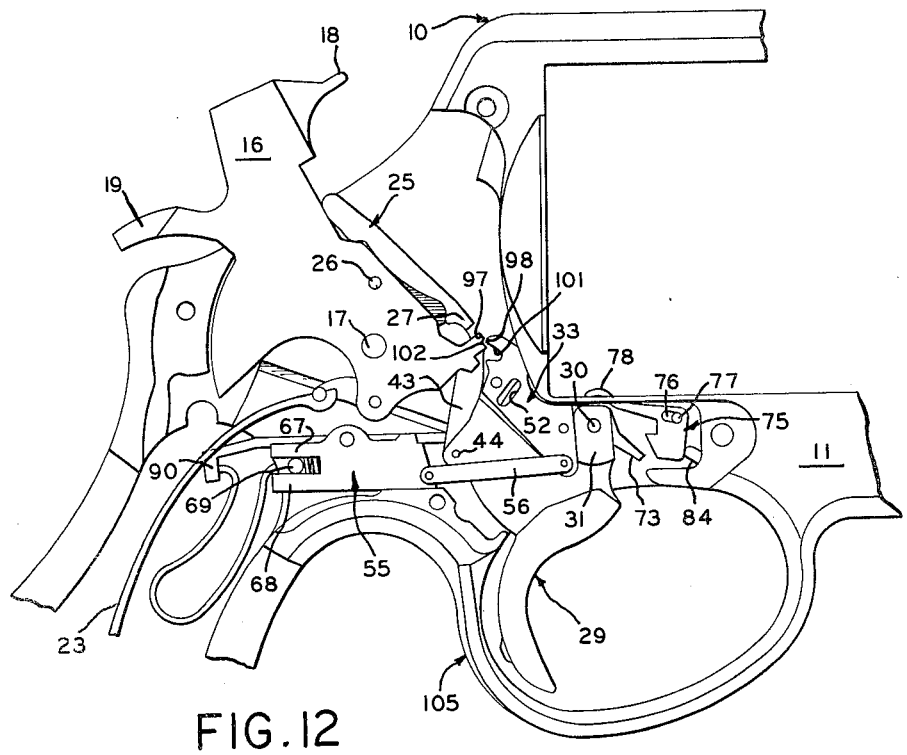
FIGURE 12 is a side elevational view, taken from the right hand side, of the firearm and showing the hammer abutting against the unyielding stop just prior to its set cock position of FIGURE 13.
Figure 11:
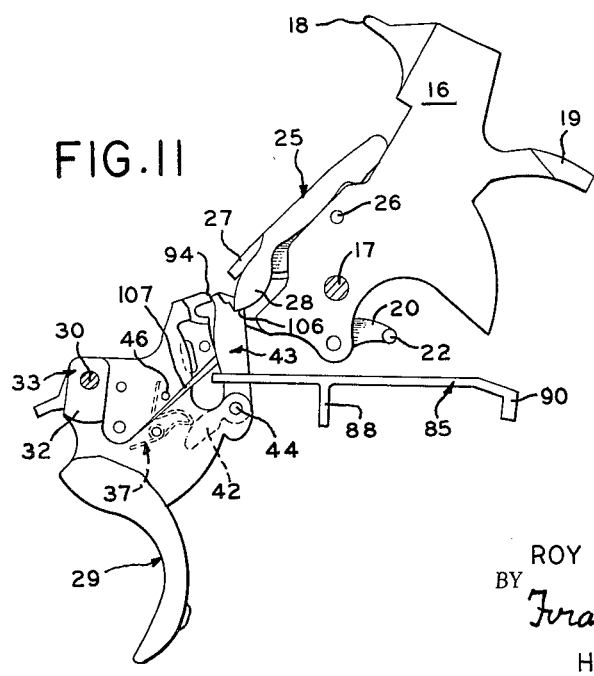
FIGURE 11 is a side elevational view, similar to FIGURE 10, of a portion of the structure of FIGURE 7 with the hammer and trigger in their fully retracted positions.

Continued rotation of the hammer 16 by actuation of the trigger 29 moves the hammer 16 to the position of FIGURES 11 and 12. In this position, the portion 103 of the hammer 16 contacts the portion 104 of the frame 11 to stop further rearward movement of the trigger 29 about the pivot stud 30. In this position, the toe 97 of the hammer 16 is disposed above the bottom 101 of the sear 33. When the portion 103 of the hammer 16 abuts against the portion 104 of the frame 11, the moving mechanism of the trigger 29, the pawl 43, and the hammer 16 is stopped because the portion 104 is an unyielding stop. It should be understood that the trigger guard 105 could be the unyielding stop for the moving mechanism, if desired, by engaging the trigger 29.

When the trigger 29 is released, the notch 102 in the toe 97 of the hammer 16 falls into engagement with the toe 98 of the sear 33. It should be understood that this is only a slight movement of the hammer 16 about the pivot stud 17 to permit the notch 102 to be engaged, and the portion 103 of the hammer 16 separates slightly from the portion 104 of the frame 11.

At the same time, the hammer pawl 43 ceases to engage the long projection 28 of the strut 25 because the finger of the user is no longer holding the trigger 29 to retain the pawl 43 in engagement with the long projection 28 of the strut 25. As a result, the spring 37 immediately moves the pawl 43 counterclockwise (as viewed in FIGURE 11) about the pin 44 to move the pawl 43 out of the path of the long projection 28 of the strut 25.

With only the spring 37 again exerting force against the toe 42 of the pawl 43, the end 45 of the spring 37 bears against the pin 46 of the sear 33 again. Since the sear 33 is held against downward movement by engagement of the toe 98 with the notch 102 of the toe 97 of the hammer 16, the force of the spring 37 causes the trigger 29 to move upwardly into engagement with the sear 33 to again form a unitary structure. Thus, the gap 107 is eliminated as clearly shown in FIGURE 13.

It should be understood that all of the foregoing actions occur simultaneously upon release of the trigger 29. Thereafter, it is only necessary to apply a very light pressure, approximately two to four pounds, to the trigger 29 to cause the hammer 16 to move to its fired position through the urging of the main hammer spring 23. This is because it is only necessary to move the toe 98 of the sear 33 out of the notch 102 in the toe 97. As soon as this slight movement occurs after the trigger 29 is actuated, the spring 23 moves the hammer 16 immediately to its fired position.

After the hammer 16 moves to its fired position, the force of the coil spring 70 in the rebound slide 55 urges the trigger 29 through the sear 33 to its rest position when pressure on the trigger 29 is released. During this movement, the shoulder 71 of the slide 55 engages the shoulder 72 of the hammer 16 to return the hammer 16 to its rebound or rest position of FIGURE 7. Of course, the movement of the slide 55 forwardly due to the force of the spring 70 results in the trigger 29 and the sear 33 returning to their rest positions.

As the trigger 29 and the sear 33 return to their rest positions, the pawl 43 is pulled slightly to the rear by the hook 92 of the link 85 so that the edge of the pawl 43 engages the front of the long projection 28 of the strut 25 (see FIGURE 14). However, because of the spring 99 constantly urging the strut 25 outwardly, the pawl 43 is able to move the strut 25 inwardly to allow the pawl 43 to pass beneath the long projection 28 of the strut 25. Similarly, the sear 33 engages the front of the short portion 27 of the strut 25 and overcomes the force of the spring 99 to move the strut 25 inwardly to allow the sear 33 to pass beneath the strut 25 of the hammer 16.

When the hammer 16 is at its rest position and the trigger 29 and the sear 33 are at their rest positions, the hook 92 of the link 85 of the selection mechanism is again in engagement with the contact face 93 of the pawl 43 as shown in FIGURE 8. The firearm 10 may then be easily fired again in triple action if desired.

It should be understood that the cylinder stop 75 is actuated by the projection 73 of the sear 33 when the trigger 29 is moved rearwardly in the same manner as described when the selection mechanism is in its double acting position. Likewise, the cylinder pawl 47 functions in the same manner as it does when the link 85 of the selection mechanism is positioned by the wedge member 89 in the double action position.

It should be understood that faster rotation may be imparted to the hammer 16 when the top surface 106 of the pawl 43 engages the long projection 28 of the strut 25 even if the radial distance of the short portion 27 of the strut 25 from the pivot stud 17 is equal to or less than the radial distance of the long projection 28 of the strut 25 from the pivot stud 17. In this arrangement, the radial distance of the axis of the pivot pin 44 from the axis of the pivot stud 30 is increased. It is only necessary that the hammer toe 97 cause faster angular rotation of the sear 33 than the trigger 29 after the top surface 106 of the pawl 43 engages the cooperating part of the hammer 16.

It also should be understood that initial rotation of the hammer 16 with the link 85 in its triple action position need not be by the face 94 of the sear 33 contacting the short portion 27 of the strut 25. By changing the length of the pawl 43 and/or the radial distances of the pin 44 from the stud 30 and the long projection 28 of the strut 25 from the pivot stud 17, all rearward rotation of the hammer 16 with the link 85 in its triple action position may be accomplished by contact of only the top surface 106 of the pawl 43 with the cooperating part of the hammer 16. However, this arrangement does not produce as smooth leverage flow as the preferred arrangement.

When it is desired to move the hammer 16 manually to its set cock position of FIGURE 13 from its rest position of FIGURE 7 with the link 85 disposed in its triple action position by the wedge member 89 of the selection mechanism, the thumb spur 19 of the hammer 16 is grasped. This causes rotation of the hammer 16 about the pivot stud 17 against the forces of the spring 23. As the hammer 16 is moved, the upper portion 100 of the toe 97 of the hammer 16 engages the bottom 101 of the sear 33 to pivot the sear 33 about the stud 30.

Since the hook 92 of the link 85 is engaging the contact face 93 of the pawl 43, the spring 37 is pushed upwardly by the toe 42 of the pawl 43 so that the end 45 of the spring 37 does not bear against the pin 46 of the sear 33. This allows the sear 33 to be moved about the pivot stud 30 by the toe 97 of the hammer 16 without initially moving the trigger 29.

The sear 33 continues to move with respect to the trigger 29 until a portion 108 (see FIGURE 20) of the sear 33 engages a portion 109 (see FIGURE 19) of the trigger 29 adjacent the pivot stud 30. The gap between the sear 33 and the trigger 29 is permitted to be slightly larger than the gap 107, which is formed between the trigger 29 and the sear 33 when the trigger 29 is actuated in triple action to move the hammer 16 to its set cock position.

With the gap being larger than the gap 107, the top surface 106 of the pawl 43 is not able to reach the long projection 28 of the strut 25 as the hammer 16 is rotated about the stud 17. The friction drag of the hook 92 of the link 85 against the contact face 93 of the pawl 43 assists in maintaining this gap as wide as possible.

As soon as the hook 92 of the link 85 ceases to engage the contact face 93 of the pawl 43, the spring 37 pivots the pawl 43 counter-clockwise (as viewed in FIGURE 13) to move it out of any possible engagement with the long projection 28 of the strut 25 as the hammer 16 is pivoted rearwardly or as it falls forwardly when fired.

With the spring 37 exerting force on the toe 42 of the pawl 43, the end 45 of the spring 37 again bears against the pin 46 of the sear 33. This causes the trigger 29 to be brought upwardly into engagement with the sear 33 to close the gap and again form a unitary assembly. This occurs just before the hammer 16 reaches its set cock position.

After the portion 103 of the hammer 16 engages the portion 104 of the frame 11, the toe 98 of the sear 33 falls into the notch 102 in the hammer toe 97 as soon as the pressure on the hammer spur 19 is released to place the hammer 16 in its set cock position. This results in a very slight forward movement of the hammer 16, and the portion 103 of the hammer 16 separates slightly from the portion 104 of the frame 11.

It should be understood that when the hammer 16 is moved manually to its set cock position, the cylinder stop 75 is actuated by the projection 73 of the sear 33 in the manner previously described when the link 85 is held in its double action position by the wedge member 89 and the hammer 16 is moved manually to its set cock position. Likewise, the cylinder pawl 47 functions to move the revolving cylinder 12 in the same manner as described when the link 85 is positioned in its double action position by the wedge member 89.

With the hammer 16 positioned as shown in FIGURE 13, it is only necessary to actuate the trigger 29 with a very light pressure to move the toe 98 of the sear 33 out of the notch 102 of the toe 97 of the hammer 16. As soon as the toe 97 of the hammer 16 is no longer held by the sear 33, the main hammer spring 23 moves the hammer 16 to its fired position.

The remainder of the operation in which the trigger 29 and the sear 33 return to their rest positions as well as the hammer 16 returning to its rest position is the same as described when the hammer 16 is fired from its set cock position after being placed in that position by the actuation of the trigger 29 rather than manually. Accordingly, a further description will not be set forth.

While the selection mechanism including the wedge member 89 may be easily employed whenever the firearm 10 is to be utilized for target practice, for example, it is not the preferred type of selection mechanism to be utilized when the firearm 10 is used in police work, for example. When used in police work, it is highly desirable to rapidly move the mechanism from the double action position to the triple action position and vice versa. Accordingly, other types of selection mechanisms are shown in FIGURES 16 and 17.

The selection mechanism of FIGURE 16 includes a yoke comprising a rod or cross arm 110 with a selector or thumb lever 111 on one end of the arm 110 adjacent the exterior of the side plate 60 and a selector or thumb lever 111' (see FIGURE 27) on the other end of the arm 110 adjacent the exterior of the frame 11. The arm 110 is disposed within a slot 112 (see FIGURE 15) in the frame 11 and a similar slot 113 in the side plate 60.

The arm 110 is held up in the slots 112 and 113 by the grips (not shown) when they are retained in position. This arrangement permits quick disassembly of the yoke from the gun.

With the arm 110 so disposed, the selector levers are disposed on opposite sides of the firearm 10 to be quickly moved ambidextrously by either thumb of the user of the gun. The selector levers 111 and 111' have right angle ledges 114 and 114', respectively, against the top surfaces of which the thumb presses.

The arm 110 has a slot 115 therein for reception of a member 116 attached thereto. The member 116 has a portion 117 extending upwardly above the arm 110 and a portion 118 extending downwardly below the arm 110. The lower portion 118 of the member 116 cooperates with the link 85, which is to be positioned in the groove 86 in the frame 11 as previously described when the wedge member 89 is employed.

Of course, it should be understood that the aperture in the frame 11 in which the wedge member 89 is disposed when that selection mechanism is used must be closed by a suitable dummy closure member (not shown). Furthermore, it should be understood that the firearm 10 could be manufactured without the aperture therein and without the wedge member 89 and its selection mechanism being utilized at all.

The projection 90 of the link 85 is adapted to be connected to the lower portion 118 of the member 116 by a compression spring 119. The spring 119 fits within small openings in the projection 90 and the lower portion 118 of the member 116. The spring 119 is strong enough to maintain this connection and still overcome the spring 37 when necessary.

The selector lever 111 of the yoke just clears the side plate 60 and has a right angle flange 120 extending through an opening in the side plate 60 into the interior of the firearm 10. The flange 120 has an opening to receive one end of a spring 121, which has its other end secured in an opening in the frame 11 of the firearm 10.

The spring 121 constantly urges the selector levers upwardly. This results in the link 85 being urged forwardly so that the hook 92, which bears against the contact face 93 of the pawl 43 when the link 85 is in its rearward position, cannot engage the face 93. As a result, the selection mechanism is normally disposed in its double action position because of the spring 121.

Therefore, when it is desired to position the selection mechanism of FIGURE 16 in triple action, it is only necessary to depress one of the selector levers depending on whether the user is left handed or right handed. The arc of depression is very small, preferably about 7 degrees. This allows the hammer 16 to be moved rapidly to its set cock position by use of the trigger 29, after release of the trigger 29, a very slight pressure on the trigger 29 is required to fire the gun.

With the selection mechanism of FIGURE 16, the firearm 10 is always ready to be fired double action. While the firearm 10 also could be fired single action by manually cocking the hammer 16 with the selection mechanism of FIGURE 16 in its double action position, it is quicker to depress the selector levers to move the selection mechanism of FIGURE 16 to its triple action position and employ the trigger 29 to place the hammer 16 on set cock.

When used with the selection mechanism of FIGURE 16, the projection 88 of the link 85 is employed as a stabilizer to prevent the link 85 from rolling in the groove 86 in the frame 11 because of the up and down motion of the forward edge of the pawl 43 against the hook 92 of the link 85. The projection 88 also serves the same function when used with the wedge member 89.

One end of the thumb lever 111 has a straight portion 122 and curved portions 123 and 124 for cooperation with the head of a latch 125. The head of the latch 125 has a groove or channel cut therein at right angle to the longitudinal axis of the latch 125.

When the groove or channel in the head of the latch 125 is positioned so that the portion 122 will pass therein, the thumb levers may be easily moved to the triple action (dotted lines in FIGURE 16) position by the user. The head of the latch 125 engages the bottom of the ledge 114 of the selector lever 111 to limit downward movement of the selector levers by the user. The force of the spring 121 results in the head of the latch 125 abutting against a bottom edge 126 of the thumb lever 111 to normally position the selection mechanism in its double action position. This limits upward movement of the selector levers.

When the latch 125 is rotated so that the channel or groove in the head of the latch 125 no longer will pass the portion 122 of the thumb lever 111, the head of the latch 125 may bear against either of the curved portions 123 and 124 to lock the selector levers in either of their downward (triple action) or upward (double action) position.

The latch 125 has a pair of oppositely disposed notches 127 and 128 in its periphery for cooperation with a spring 129 in the side plate 60. The spring 129 cooperates with the notch 127 to retain the latch 125 in either the curved portion 123 or the curved portion 124. The spring 129 cooperates with the notch 128 to permit free up and down movement of the selector levers.

Another type of selection mechanism, which may be employed with the yoke is shown in FIGURE 17. The upper portion 117 of the member 116 of the yoke is utilized with this selection mechanism.

A second groove 130 is provided in the frame 11 (see FIGURE 15) to receive a link 131. It should be observed that no receptacle 87 or the like is required by the link 131.

The link 131 has a hook 132 on one end for engaging the contact face 93 of the pawl 43 in the same manner as the hook 92 of the link 85 does. The hook 132 extends at a right angle to the frame 11.

The other end of the link 131 has an extension 133 against which the upper portion 117 of the member 116 of the yoke bears to provide a connection from the yoke to the link 131. A spring 134 connects the link 131 to the portion 117 of the member 116. The spring 134 is strong enough to maintain this connection and still overcome the spring 37 when necessary. The extension 133 also acts as a stabilizer for the link 131.

In the selection mechanism of FIGURE 17, the force of the spring 121, which is stronger than the spring 37, results in the link 131 being urged rearwardly to cause the hook 132 to engage the contact face 93 of the pawl 43 to place the firearm mechanism in the triple action position. Thus, the selector levers are normally in the triple action position (solid lines) and must be depressed to be moved to the double action position (dotted lines). Accordingly, if one should prefer to have the gun normally in the triple action position rather than the double action position, the link 131 would be utilized rather than the link 85.

If desired, the long projection 28 of the strut 25 could be eliminated and replaced by a solid extension from the hammer 16. In this arrangement, the pawl 43 could move downwardly past the long projection 28, which is now a fixed part of the hammer 16, by the resiliency of the spring 91, the spring 119, or the spring 134.

As previously mentioned, the pawl 43 and the long projection 28 of the strut 25 are disposed in one plane while the contact face 94 of the sear 33 and the short portion 27 of the strut 25 are disposed in a separate parallel vertical plane. Thus, the strut 25 would still remain as a separate part; the cooperation between the sear 33 and the short portion 27 of the strut 25 along with the spring 99 of the strut 25 would produce the same functions therebetween.

Figure 22:
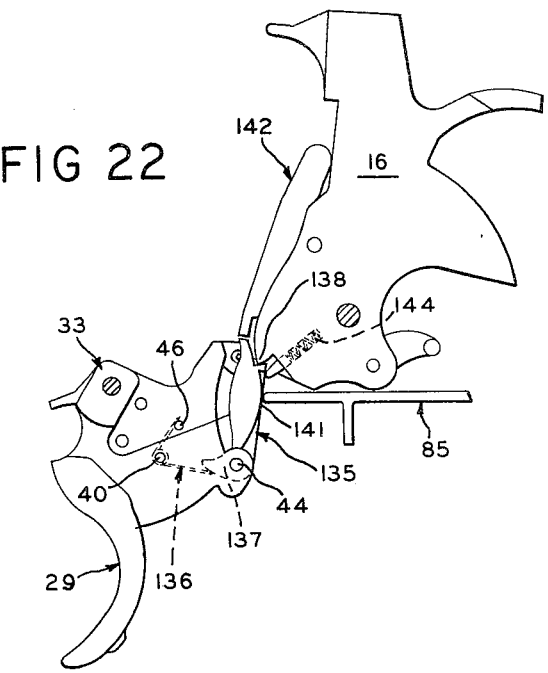
FIGURE 22 is a side elevational view of a portion of a firearm with the hammer and the trigger slightly rotated to a position similar to FIGURE 9 and showing another form of the present invention.
Figure 23:
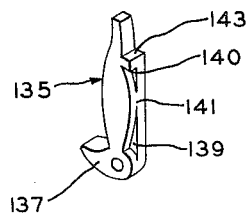
FIGURE 23 is a perpsective view of the pawl of FIGURE 22.

Referring to FIGURES 22 and 23, another form of the invention is shown wherein a pawl 135, which is pivotally mounted on the trigger 29 by the pin 44, replaces the pawl 43. A spring 136 is attached to the pin 40 of the trigger 29 and has one end acting on a toe 137 of the pawl 135 to constantly urge the pawl 135 towards engagement with a portion 138 of the hammer 16. The spring 136 has its other end acting against the pin 46 to urge the sear 33 and the trigger 29 together.

The hook 92 of the link 85 rides in spaced lower and upper cut out portions 139 and 140 (see FIGURE 23) of the pawl 135 when the link 85 is in its rearward position whereby the gun may be fired triple action. The pawl 135 has a face 141, which forms the inside end of the cut out portions 139 and 140 and the portion of the pawl 135 therebetween, curved to prevent contact between the pawl 135 and the hook 92 of the link 85 when the link 85 is in its rearward position and the trigger is actuated. The curvature of the face 141 insures that the hook 92 remains in contact with the face 141 during backward rotation of the hammer 16 when the link 85 is in its forward (double action) position.

When the trigger 29 is actuated with the link 85 in its triple action position, the top surface 94 of the sear 33 initially engages a strut 142, which is pivotally mounted on the hammer 16 and resiliently biased in the same manner as the strut 25 is pivotally mounted on the hammer 16 and resiliently biased. However, the strut 142 does not have the long projection 28 thereon as does the strut 25.

Shortly after the rotation of the hammer 16 starts because of engagement of the top surface 94 of the sear 33 with the strut 142, a top surface 143 of the pawl 135 engages the portion 138 of the hammer 16 to begin faster angular rotation of the hammer 16 in the same manner as previously described when the pawl 43 is employed.

When the hammer 16 reaches its rearmost position in which the portion 103 of the hammer 16 engages the portion 104 of the frame 11 as it does when the pawl 43 is employed with the mechanism in triple action, release of the trigger 29 results in a spring 144, which is mounted within the hammer 16, removing the pawl 135 from engagement with the hammer 16. Thereafter, the hammer 16 is fired in the same manner as when the pawl 43 is utilized by merely applying pressure again on the trigger 29.

Because of the resiliency of the spring 136, the pawl 135 passes the portion 138 of the hammer 16 when the hammer fires and as the trigger 29 returns to rest. Thus, the modification of FIGURES 22 and 23 operates in the same way in triple action as the embodiment having the pawl 43.

When it is desired to fire the gun double action with the embodiment of FIGURES 22 and 23, the link 85 is moved by the selection mechanism to its forward position. This results in the hook 92 of the link 85 engaging the contact face 141 of the pawl 135 to move the pawl 135 counter-clockwise against the force of the spring 136; this prevents the pawl 135 from engaging the portion 138 of the hammer 16 when the trigger 29 is actuated. In this forward position of the link 85, the hook 92 holds the pawl 135 within the cut out portions of the trigger 29 and the sear 33 throughout the backward rotation of the hammer 16 so that there is contact only between the top surface 94 of the sear 33 and the strut 142 and between the hip 95 of the sear 33 and the underside 96 of the hammer toe 97 to rotate the hammer 16. The remainder of the double action operation is the same as described for the embodiment having the pawl 43.

Figure 24:
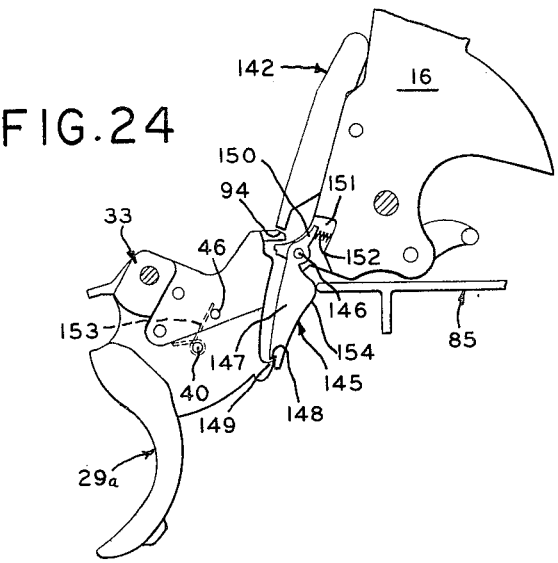
FIGURE 24 is a side elevational view of a portion of a firearm with the hammer and the trigger slightly rotated to a position similar to FIGURE 9 and showing a further embodiment of the present invention.

Referring to FIGURE 24, there is shown a further modification of the invention in which a pawl 145 is employed instead of the pawl 43. The pawl 145 is pivotally mounted on the toe 97 of the hammer 16 by a pin 146. An arm 147 of the pawl 145 has a bottom surface 148 for cooperation with a projection 149 of a trigger 29a. The trigger 29a differs from the trigger 29 by having the projection 149 thereon and not having means for pivotally mounting a pawl.

A second arm 150 of the pawl 145 is disposed with a cut out portion 151 of the hammer 16. A spring 152, which has its ends attached to the arm 150 and the hammer 16, acts on the arm 150 to constantly urge the pawl 145 counter-clockwise about the pin 146. A spring 153, which is attached to the pin 40 of the trigger 29a, acts against the pin 46 to urge the sear 33 and the trigger 29a together.

When the link 85 is in its forward position, the hook 92 bears against a rear curved face 154 of the pawl 145 to place the bottom surface 148 of the pawl 145 in engagement with the projection 149 of the trigger 29a shortly after rotation of the hammer 16 begins. In the forward position of the link 85, the gun may be fired triple action when the trigger 29a is actuated.

When the trigger 29a is actuated with the link 85 in its triple action position, the top surface 94 of the sear 33 initially engages the strut 142. Shortly after rotation of the hammer 16 starts because of engagement of the top surface 94 of the sear 33 with the strut 142, the projection 149 of the trigger 29a engages the bottom surface 148 of the pawl 145 to begin faster angular rotation of the hammer 16 in the same manner as previously described when the pawl 43 is employed.

The hook 92 ceases to contact the face 154 after such engagement of the trigger projection 149 with the bottom surface 148 of the pawl 145 because of the curvature of the face 154. The pressure on the trigger 29a retains the bottom surface 148 in engagement with the projection 149 of the trigger 29a.

When the trigger 29a is released after further rearward movement of the hammer 16 is prevented by engagement of the portion 103 of the hammer 16 with the portion 104 of the frame 11, the spring 152 moves the pawl 145 out of engagement with the projection 149 of the trigger 29a. Thus, the gun is easily fired by application of pressure again on the trigger 29a as in the embodiment using the pawl 43.

When it is desired to fire the gun double action with the modification using the pawl 145, the link 85 is moved to its rearward position by the selection mechanism whereby the hook 92 does not contact the face 154. When this occurs, the spring 152 rotates the pawl 154 counter-clockwise about the pivot pin 146 so that the pawl 145 cannot engage the projection 149 of the trigger 29a when the trigger 29a is actuated. In this position of the pawl 145, actuation of the trigger 29a results in only contact between the top surface 94 of the sear 33 and the strut 142 and between the hip 95 of the sear 33 and the underside 96 of the hammer toe 97 to fire the gun double action in the same manner as described for the embodiment having the pawl 43.

Figure 25:
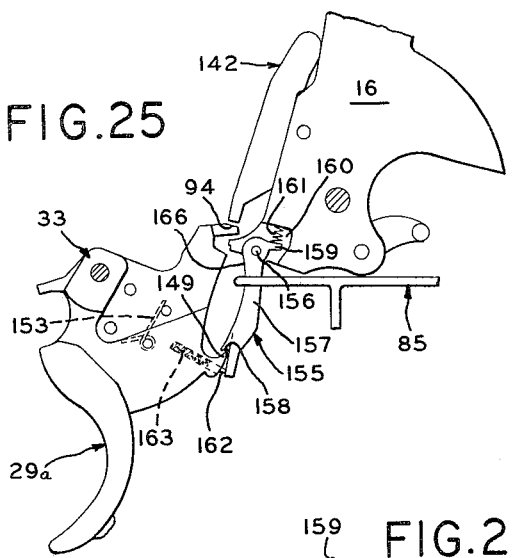
FIGURE 25 is a side elevational view of a portion of a firearm with the hammer and the trigger slightly rotated to a position similar to FIGURE 9 and showing still another modification of the present invention.
Figure 26:
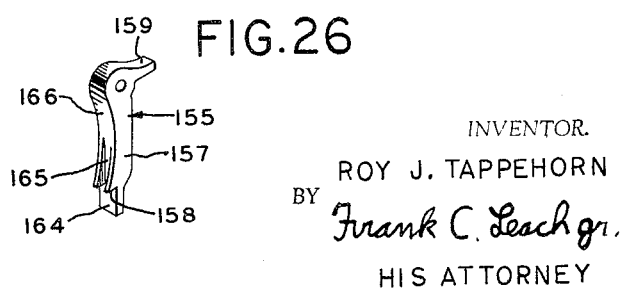
FIGURE 26 is a perspective view of the pawl of FIGURE 25.

Referring to FIGURES 25 and 26, there is shown still another embodiment of the invention in which a pawl 155 is employed instead of the pawl 43. The pawl 155 is pivotally mounted on the toe 97 of the hammer 16 by a pin 156. An arm 157 of the pawl 155 has a surface or edge 158 on its lower end for cooperation with the projection 149 on the trigger 29a.

A second arm 159 of the pawl 155 is disposed within a cut out portion 160 of the hammer 16. A spring 161, which has its ends attached to the arm 159 and the hammer 16, acts on the arm 159 to constantly urge the pawl 155 clockwise about the pin 156 so that the pawl 155 is always urged toward engagement with the trigger 29a.

When the link 85 is in its forward position, the hook 92 rides in the cut out portions of the sear 33 and the trigger 29a as it does when the pawl 43 is employed. In the forward position of the hook 92, the gun may be fired triple action when the trigger is actuated.

When the trigger 29a is actuated with the link 85 in its triple action position, the top surface 94 of the sear 33 initially engages the strut 142. Shortly after rotation of the hammer 16 starts because of engagement of the top surface 94 of the sear 33 with the strut 142, the lower edge or surface 158 of the arm 157 of the pawl 155 and the projection 149 of the trigger 29a engage to begin faster angular rotation of the hammer 16 in the same manner as previously described when the pawl 43 is employed.

As the trigger 29a is rotated, a plunger 162, which is constantly urged outwardly from the trigger 29a by a spring 163 within the trigger 29a, contacts a front surface 164 of the pawl 155. The pressure on the trigger 29a retains the edge or surface 158 of the pawl 155 in engagement with the projection 149 of the trigger 29a notwithstanding the force of the spring 163 tending to move the pawl 155 away from contact with the trigger 29a.

When the trigger 29a is released after further rearward movement of the hammer 16 is prevented by engagement of the portion 103 of the hammer 16 with the portion 104 of the frame 11, the spring 163 overcomes the force of the spring 161 to move the pawl 155 out of engagement with the projection 149 of the trigger 29a. The pawl 155 has a slot 165 (see FIGURE 26) therein adjacent the edge 158 to allow the pawl 155 to move past the plunger 162 when the hammer 16 falls. Thus, the gun is easily fired by application of pressure again on the trigger 29a as in the embodiment using the pawl 43.

When it is desired to fire the gun double action with the modification using the pawl 155, the link 85 is moved to its rearward position by the selection mechanism whereby the hook 92 engages a front curved face 166 of the pawl 155 to overcome the force of the spring 161. This results in counter-clockwise rotation of the pawl 155 about the pivot pin 156 so that the pawl 155 cannot engage the projection 149 of the trigger 29a. The front face 166 of the pawl 155 is curved to permit the hook 92 to remain in contact therewith during rotation of the trigger 29a. In this position of the pawl 155, actuation of the trigger 29a results in only contact between the top surface 94 of the sear 33 and the strut 142 and between the hip 95 of the sear 33 and the underside 96 of the hammer toe 97 to fire the gun double action in the same manner as described with respect to the embodiment having the pawl 43.

It should be understood that the link 131 could be employed instead of the link 85 with any of the embodiments of FIGURES 22 and 23, FIGURE 24, and FIGURES 25 and 26. Of course, either the wedge member 89 or the selector levers may be employed to move the link 85.

While the firearm 10 has been described with respect to a revolver having a revolving cylinder 12, it should be understood that this mechanism may be used with any firearm having a hammer. Furthermore, it should be understood that the mechanism of the present invention also may be employed with a firearm in which the hammer is not exposed for manual actuation.

An advantage of this invention is that three methods of firing a firearm may be accomplished with a single firearm and two of the three methods are always available simultaneously. Another advantage of this invention is that the pull force of the trigger to terminate set cock is no greater when the selection mechanism is in triple action than is required to fire the gun when the hammer is manually cocked as in single action. A further advantage of this invention is that a single spring is employed to rebound the hammer, return the trigger to rest, and actuate the sear.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:
1. A firearm comprising:
   a frame;
   a hammer pivotally mounted on said frame;
   a trigger and a sear pivotally mounted on said frame;
   a pawl pivotally mounted on said trigger;
   said hammer having cooperating means for engagement by said sear and said pawl;
   said sear engaging said cooperating means of said hammer when said trigger is actuated;
   means to urge said pawl away from engagement with said cooperating means of said hammer when said trigger is actuated;
   and means to overcome said pawl urging means to move said pawl to a position in which said pawl engages said cooperating means of said hammer to pivot said hammer a greater number of degrees than when said cooperating means of said hammer is engaged solely by said sear.

2. A firearm according to claim 1 in which said trigger and said sear have a substantially common pivot axis.

3. A firearm according to claim 1 in which said pawl urging means is resilient.

4. A firearm according to claim 1 in which said pawl urging means is mounted on said trigger.

5. A firearm according to claim 3 in which said pawl urging means is mounted on said trigger.

6. A firearm comprising:
   a frame;
   a hammer pivotally mounted on said frame for movement to a set cock position, a double action position, a fired position, and a rest position;
   a trigger pivotally mounted on said frame;
   a sear pivotally mounted on said frame;
   a pawl pivotally mounted on said trigger;
   said hammer having cooperating means adapted to be engaged by said sear and said pawl when said trigger is actuated;
   means to dispose said pawl so as to not engage said cooperating means of said hammer when said trigger is actuated whereby said sear moves said hammer to said double action position when said trigger is actuated;
   means to move said pawl from its non-engaging position so said pawl will engage said cooperating means of said hammer when said trigger is actuated whereby said hammer is moved to said set cock position when said trigger is actuated and released;
   said hammer moving from said double action position to said fired position by continued actuation of said trigger;
   said hammer moving from said set cock position to said fired position by again actuating said trigger;
   and a single spring to rebound said hammer to said rest position, to return said trigger to its rest position, and to actuate said sear.

7. A firearm according to claim 6 in which said sear has substantially the same pivot axis as said trigger.

8. A firearm including:
   a pivotally mounted hammer;
   a pivotally mounted trigger;
   a pivotally mounted sear movable with respect to said trigger and adapted to be moved by actuation of said trigger at the same angular velocity as said trigger;
   said sear and said trigger having a substantially common pivot axis;
   a pawl pivotally mounted on said trigger for rotation by actuation of said trigger;
   said pawl adapted to engage said hammer when said pawl is rotated by actuation of said trigger;
   means to prevent contact between said pawl and said hammer when said trigger is actuated;
   means to overcome said contact preventing means to permit contact between said pawl and said hammer when said trigger is actuated;
   and said hammer having means engaging said sear when said pawl engages said hammer during rotation by said trigger to rotate said hammer whereby said sear rotates about its pivot axis at a greater angular velocity than the angular velocity of said trigger.

9. A firearm comprising:
a frame;
a hammer pivotally mounted on said frame for movement to a set cock position, a double action position, and a fired position;
a trigger pivotally mounted on said frame;
means to control the amount of rotation of said hammer by actuation of said trigger;
said control means permitting movement of said hammer by said trigger to its set cock position when in one of its positions and movement of said hammer by said trigger to its double action position when in the other of its positions;
a pivotally mounted member having a portion disposed on at least one side of the exterior of said firearm for grasping by the user;
said pivotally mounted member connected to said control means to move said control means from one of its positions to the other of its positions;
resilient means constantly urging said pivotally mounted member to a position to maintain said control means in one of its positions;
said pivotally mounted member being movable against the force of said resilient means to move said control means to the other of its positions;
said hammer moving from said double action position to said fired position by continued actuation of said trigger;
and said hammer moving from said set cock position to said fired position by again actuating said trigger.

10. A firearm comprising:
a frame;
a hammer pivotally mounted on said frame for movement to a set cock position, a double action position, and a fired position;
a trigger pivotally mounted on said frame;
means to control the amount of rotation of said hammer by actuation of said trigger;
said control means permitting movement of said hammer by said trigger to its set cock position when in one of its positions and movement of said hammer by said trigger to its double action position when in the other of its positions;
a pivotally mounted member having portions disposed on each side of the exterior of said firearm for grasping by the user;
said pivotally mounted member connected to said control means to move said control means from one of its positions to the other of its positions;
resilient means constantly urging said pivotally mounted member to a position to maintain said control means in one of its positions;
said pivotally mounted member being movable against the force of said resilient means to move said control means to the other of its positions;
said hammer moving from said double action position to said fired position by continued actuation of said trigger;
and said hammer moving from said set cock position to said fired position by again actuating said trigger.

11. A firearm including:
a pivotally mounted trigger;
a pivotally mounted hammer movable to a set cock position and a fired position;
an unyielding stop;
means to rotate said hammer in response to rotation of said trigger, said rotating means and said hammer being limited in movement by said unyielding stop;
means to hold said hammer in said set cock position when said trigger is released;
said hammer being released from said holding means to allow said hammer to move to said fired position when said trigger is again moved;
and said holding means including a sear separate from said trigger, said sear being adapted to engage said trigger to return said trigger to rest after said hammer has been released from said set cock position by actuation of said trigger.

12. A firearm including:
a pivotally mounted trigger;
a pivotally mounted hammer movable to a set cock position, a fired position, and a rest position;
an unyielding stop;
means to rotate said hammer in response to rotation of said trigger, said rotating means and said hammer being limited in movement by said unyielding stop;
means to hold said hammer in said set cock position when said trigger is released;
said hammer being released from said holding means to allow said hammer to move to said fired position when said trigger is again moved;
said holding means including a sear separate from said trigger;
and a single spring adapted to actuate said sear and to rebound said hammer from said fired position to said rest position.

13. A firearm comprising:
a pivotally mounted hammer;
a pivotally mounted trigger;
a pivotally mounted sear movable by actuation of said trigger;
means uring said sear and said trigger into engagement;
a pawl;
said urging means acting on said pawl to prevent contact between said pawl and said hammer when said trigger is actuated;
and means engaging said pawl to overcome said urging means whereby said pawl engages said hammer when said trigger is actuated to move said hammer, said urging means being rendered inactive insofar as urging said sear and said trigger into engagement when said pawl engages said hammer.

14. A firearm according to claim 13 in which said urging means is resilient.

15. A firearm according to claim 13 in which said pawl is pivotally mounted on said trigger.

16. A firearm comprising:
a pivotally mounted hammer movable to a set cock position;
a pivotally mounted trigger;
a pivotally mounted sear;
a pawl adapted to engage said hammer when said trigger is actuated;
resilient means constantly urging said pawl away from engagement with said hammer;
means to overcome said resilient means to allow said pawl to be moved by actuation of said trigger into engagement with said hammer to move said hammer;
said trigger, said pawl, and said hammer forming a moving mechanism;
and stationary means to stop movement of said moving mechanism by engagement therewith whereby said hammer is positioned at its set cock position after relase of said trigger.

17. A fire arm according to claim 16 in which said pawl is pivotally mounted.

18. A firearm according to claim 16 in which said resilient means is fastened on said trigger.

19. A firearm according to claim 16 in which said pawl is pivotally mounted on said trigger.

20. A firearm including:
a revolving cylinder;
a pivotally mounted hammer;
a pivotally mounted trigger;
a sear movable with respect to said trigger and movable by actuation of said trigger;

said sear holding said hammer when said trigger is released;

said sear and said trigger having a substantially common pivot axis;

a cylinder pawl adapted to cause rotation of said revolving cylinder;

and a spring attached to said sear and acting on said cylinder pawl to urge said cylinder pawl to its position in which it causes rotation of said revolving cylinder.

21. A firearm according to claim 20 in which said cylinder pawl is pivotally mounted on said sear.

22. A firearm including:

a revolving cylinder having a plurality of cartridge chambers therein;

a pivotally mounted hammer;

a pivotally mounted trigger;

a separate sear movable with respect to said trigger and movable by actuation of said trigger to engage said hammer;

a cylinder pawl adapted to cause rotation of said revolving cylinder, said cylinder pawl being operated by said sear when said rear is moved;

a spring attached to said sear and acting on said cylinder pawl to urge said cylinder pawl to its position in which it causes rotation of said revolving cylinder;

said revolving cylinder having a plurality of spaced recesses in its periphery equal in number to said cartridge chambers in said revolving cylinder;

and a cylinder stop adapted to cooperate with said recess in the periphery of said revolving cylinder, said cylinder stop being operated by said sear when said sear is moved.

23. A firearm comprising:

a pivotally mounted hammer movable between a fired position and a set cock position;

a resilient means urging said hammer to its fired position;

a pivotally mounted trigger;

a pivotally mounted sear;

said sear being rotated about its pivot axis to engage said hammer when said trigger is actuated;

said hammer and said trigger having cooperating means thereon;

one of said cooperating means being movable between a position in which said cooperating means engage each other and a position in which said cooperating means do not engage each other;

means to maintain said movable cooperating means in one of its positions;

selection means to overcome said maintaining means to move said movable cooperating means to the other of its positions;

said trigger, said cooperating means, and said hammer forming a moving mechanism to rotate said hammer when said cooperating means engage each other;

an unyielding stop engaging said moving mechanism to stop movement thereof whereby said hammer is positioned at its set cock position when said trigger is released;

said sear holding said hammer in its set cock position;

said hammer being released from engagement with said sear to be moved by said hammer urging means to its fire position when said trigger is again actuated;

said hammer being moved to an intermediate position between its fired and set cock positions by said sear when said trigger is actuated and said movable cooperating means is in the position in which said cooperating means do not engage each other;

and said hammer being moved from its intermediate position to its fired position by continued actuation of said trigger to remove said sear from engagement with said hammer and allow said hammer urging means to move said hammer to its fired position.

24. A firearm according to claim 23 in which said movable cooperating means is pivotally mounted.

25. A firearm according to claim 23 in which said trigger and said sear have a substantially common pivot axis.

26. A firearm according to claim 23 in which said movable cooperating means is pivotally mounted on said trigger.

27. A firearm according to claim 25 in which said movable cooperating means is pivotally mounted on said trigger.

28. A firearm according to claim 23 in which said maintaining means is resilient.

29. A firearm according to claim 26 in which said maintaining means is fastened to said trigger.

30. A firearm according to claim 29 in which said maintaining means is resilient.

31. A firearm according to claim 29 in which said maintaining means also acts to maintain said sear and said trigger in engagement with each other.

32. A firearm according to claim 31 in which said trigger and said sear have a substantially common pivot axis.

33. A firearm according to claim 23 in which said hammer is movable to its set cock position by grasping said hammer manually irrespective of the position of said movable cooperating means.

34. A firearm comprising:

a pivotally mounted hammer movable between a fired position and a set cock position;

resilient means urging said hammer to its fired position;

a pivotally mounted trigger;

a pivotally mounted sear adapted to be rotated about its pivot axis in one direction by rotation of said trigger in the same direction, said sear engaging said hammer to rotate said hammer about its pivot axis towards its set cock position when said sear is rotated in said one direction by actuation of said trigger;

said hammer and said trigger having cooperating means thereon;

one of said cooperating means being movable between a position in which said cooperating means engage each other and a position in which said cooperating means do not engage each other;

means to maintain said movable cooperating means in one of its positions;

selection means to overcome said maintaining means to move said movable cooperating means to the other of its positions;

said trigger, said cooperating means, and said hammer forming a moving mechanism to rotate said hammer when said cooperating means engage each other;

an unyielding stop engaging said moving mechanism to stop movement thereof whereby said hammer is positioned at its set cock position when said trigger is released;

said sear holding said hammer in its set cock position;

said hammer being released from engagement with said sear to be moved by said hammer urging means to its fired position when said trigger is again actuated;

said hammer being moved to an intermediate position between its fired and set cock positions by said sear when said trigger is actuated and said movable cooperating means is in the position in which said cooperating means do not engage each other;

and said hammer being moved from its intermediate position to its fired position by continued actuation of said trigger to remove said sear from engagement with said hammer and allow said hammer urging means to move said hammer to its fired position.

35. A firearm according to claim 34 in which said movable cooperating means is pivotally mounted.

36. A firearm according to claim 34 in which said sear and said trigger have a substantially common pivot axis.

37. A firearm according to claim 34 in which said sear is movable relative to said trigger.

38. A firearm according to claim 34 in which said maintaining means constantly acts on said movable cooperating means.

39. A firearm according to claim 34 in which said maintaining means is resilient.

40. A firearm according to claim 38 in which said maintaining means is resilient.

41. A firearm according to claim 34 in which said hammer is movable to its set cock position by grasping said hammer manually irrespective of the position of said movable cooperating means.

42. A firearm according to claim 34 in which said movable cooperating means is pivotally mounted on said trigger.

43. A firearm according to claim 34 in which said selection means acts on said movable cooperating means.

44. A firearm comprising:
a pivotally mounted hammer movable between a fired position and a set cock position;
resilient means urging said hammer to its fired position;
a pivotally mounted trigger;
a pivotally mounted sear adapted to be rotated about its pivot axis in one direction by rotation of said trigger in the same direction;
said sear being movable relative to said trigger;
said sear engaging said hammer to rotate said hammer about its pivot axis towards its set cock position when said sear is rotated in said one direction by actuation of said trigger;
a pawl adapted to engage said hammer when said trigger is rotated;
resilient means acting on said pawl to urge said pawl away from an engaging position with said hammer when said trigger is actuated, said resilient means preventing relative movement between said trigger and said sear;
selection means to overcome said resilient means to allow said pawl to engage said hammer when said trigger is actuated and to permit relative movement of said trigger and said sear;
said trigger, said pawl, and said hammer forming a moving mechanism to rotate said hammer;
an unyielding stop engaging said moving mechanism to stop movement thereof whereby said hammer is positioned at its set cock position when said trigger is released;
said sear holding said hammer in its set cock position;
said hammer being released from engagement with said sear to be moved by said hammer urging means to its fired position when said trigger is again actuated;
said hammer being moved to an intermediate position between its fired and set cock positions by said sear when said trigger is actuated and said pawl is maintained in its non-engaging position by said resilient means;
and said hammer being moved from its intermediate position to its fired position by continued actuation of said trigger to remove said sear from engagement with said hammer and allow said hammer urging means to move said hammer to its fired position.

45. A firearm comprising:
a pivotally mounted hammer movable between a fired position and a set cock position;
resilient means urging said hammer to its fired position;
said hammer having a spring biased strut pivotally mounted thereon, said strut having a projection disposed closer to the pivot axis of said hammer than a second portion;
a pivotally mounted trigger;
a pivotally mounted sear adapted to be rotated about its pivot axis in one direction by rotation of said trigger in the same direction;
said sear engaging said second portion on said strut of said hammer to rotate said hammer about its pivot axis away from its rest position when said sear is rotated in said one direction by actuation of said trigger;
a pawl adapted to engage said projection on said strut of said hammer when said trigger is rotated;
means acting on said pawl to urge said pawl away from an engaging position with said projection on said strut of said hammer when said trigger is actuated;
selection means to overcome said pawl urging means to allow said pawl to engage said projection on said strut of said hammer when said trigger is actuated;
said trigger, said pawl, and said hammer forming a moving mechanism to rotate said hammer;
an unyielding stop engaging said moving mechanism to stop movement thereof whereby said hammer is positioned at its set cock position when said trigger is released;
said sear holding said hammer in its set cock position;
said hammer being released from engagement with said sear to be moved by said hammer urging means to its fired position when said trigger is again actuated;
said hammer being moved to an intermediate position between its fired and set cock positions by said sear when said trigger is actuated and said pawl is maintained in its non-engaging position by said pawl urging means;
and said hammer being moved from its intermediate position to its fired position by continued actuation of said trigger to remove said sear from engagement with said hammer and allow said hammer urging means to move said hammer to its fired position.

46. A firearm comprising:
a pivotally mounted hammer movable between a fired position and a set cock position;
resilient means urging said hammer to its fired position;
said hammer having a spring biased strut pivotally mounted thereon, said strut having a projection disposed closer to the pivot axis of said hammer than a second portion;
a pivotally mounted trigger;
a pivotally mounted sear adapted to be rotated about its pivot axis in one direction by rotation of said trigger in the same direction;
said sear being movable relative to said trigger;
said sear engaging said second portion on said strut of said hammer to rotate said hammer about its pivot axis away from its rest position when said sear is rotated in said one direction by actuation of said trigger;
a pawl adapted to engage said projection on said strut of said hammer when said trigger is rotated;
resilient means acting on said pawl to urge said pawl away from an engaging position with said projection on said strut of said hammer when said trigger is actuated, said resilient means preventing relative movement between said trigger and said sear;
selection means to overcome said resilient means to allow said pawl to engage said projection on said strut of said hammer when said trigger is actuated and to permit relative movement of said trigger and said sear;
said trigger, said pawl, and said hammer forming a moving mechanism to rotate said hammer;
an unyielding stop engaging said moving mechanism to stop movement thereof whereby said hammer is positioned at its set cock position when said trigger is released;

said gear holding said hammer in its said cock position;

said hammer being released from engagement with said sear to be moved by said hammer urging means to its fired position when said trigger is again actuated;

said hammer being moved to an intermediate position between its fired and set cock positions by said sear when said trigger is actuated and said pawl is maintained in its non-engaging position by said resilient means;

and said hammer being moved from its intermediate position to its fired position by continued actuation of said trigger to remove said sear from engagement with said hammer and allow said hammer urging means to move said hammer to its fired position.

47. A firearm according to claim 45 in which said sear is movable relative to said trigger.

48. A firearm according to claim 45 in which said sear and said trigger have a substantially common pivot axis.

49. A firearm including:
a pivotally mounted hammer for movement to a set cock position, a fired position, and a rest position;
resilient means urging said hammer to its fired position;
a pivotally mounted trigger;
a pivotally mounted sear;
said sear being rotated in response to rotation of said trigger to engage said hammer to move it away from its rest position;
a pawl movable in response to rotation of said trigger to engage said hammer;
said trigger, said pawl, and said hammer forming a moving mechanism to rotate said hammer;
an unyielding stop engaging said moving mechanism to stop movement thereof whereby said hammer is positioned at its set cock position when said trigger is released;
said hammer being held in its set cock position by said sear;
said pawl being released from engagement with said hammer upon release of said trigger;
said sear being disengaged from said hammer by further actuation of said trigger after release of said trigger whereby said hammer urging means moves said hammer to its fired position;
and means to rebound said hammer to its rest position;

50. A firearm according to claim 49 in which said sear returns said trigger to its rest position.

51. A firearm according to claim 49 in which said hammer rebound means is a spring, said spring also actuating said sear and returning said trigger to its rest position.

52. A firearm comprising:
a hammer pivotally mounted for movement to a double action position and a set cock position;
a pivotally mounted trigger;
a pivotally mounted sear to hold said hammer at said set cock position;
said sear being rotated about its pivot axis to engage said hammer when said trigger is rotated;
said hammer and said trigger having cooperating means thereon;
one of said cooperating means being movable between an interposing position to form a connection between said trigger and said hammer when said trigger is actuated and a non-interposing position between said trigger and said hammer;
means to maintain said one cooperating means in one of said interposing and non-interposing positions;
selection means to overcome said maintaining means to move said one cooperating means to the other of said interposing and non-interposing positions;

said one cooperating means in said interposing position forming a connection between said trigger and said hammer when said trigger is actuated by which actuation of said trigger imparts rotation of said hammer to said set cock position;
and said one cooperating means in said non-interposing position resulting in said sear engaging said hammer during actuation of said trigger to rotate said hammer to said double action position.

53. A firearm comprising:
a frame;
a hammer pivotally mounted on said frame;
a trigger and a sear pivotally mounted on said frame;
a pivotally mounted pawl movable between an interposing position to form a connection between said trigger and said hammer when said trigger is actuated and a non-interposing position between said trigger and said hammer;
means to urge said pawl to one of said interposing and non-interposing positions;
means to overcome said pawl urging means to move said pawl to the other of said interposing and non-interposing positions;
said sear engaging said hammer to pivot said hammer when said trigger is actuated with said pawl in said non-interposing position;
and said pawl in said interposing position forming a connection between said trigger and said hammer when said trigger is actuated to pivot said hammer a greater number of degrees than when said pawl is in said non-interposing position.

54. A firearm comprising:
a frame;
a hammer pivotally mounted on said frame for movement to a set cock position, a double action position, a fired position, and a rest position;
a trigger pivotally mounted on said frame;
a sear pivotally mounted on said frame;
a pivotally mounted pawl movable between an interposing position to form a connection between said trigger and said hammer when said trigger is actuated and a non-interposing position between said trigger and said hammer;
means to urge said pawl to one of said interposing and non-interposing positions;
means to overcome said pawl urging means to move said pawl to the other of said interposing and non-interposing positions;
said pawl in said interposing position forming a connection between said hammer and said trigger when said trigger is actuated whereby said hammer is moved to said set cock position when said trigger is actuated and released;
said sear engaging said hammer to move said hammer to said double action position when said trigger is actuated with said pawl in said non-interposing position;
said hammer moving from said double action position to said fired position by continued actuation of said trigger;
said hammer moving from said set cock position to said fired position by again actuating said trigger;
and a single spring to rebound said hammer to said rest position, to return said trigger to its rest position, and to actuate said sear.

55. A firearm including:
a pivotally mounted hammer;
a pivotally mounted trigger;
a pivotally mounted sear movable with respect to said trigger and adapted to be moved by actuation of said trigger at the same angular velocity as said trigger;
said sear and said trigger having a substantially common pivot axis;

a pivotally mounted pawl movable between an interposing position to form a connection between said trigger and said hammer when said trigger is actuated and a non-interposing position between said trigger and said hammer;
means to urge said pawl to one of said interposing and non-interposing positions;
means to overcome said pawl urging means to move said pawl to the other of said interposing and non-interposing positions;
said pawl in said interposing position forming a connection between said trigger and said hammer when said trigger is actuated whereby actuation of said trigger imparts rotation to said hammer;
and said hammer having means engaging said sear when said pawl is in said interposing position during actuation of said trigger to cause said sear to rotate about its pivot axis at a greater angular velocity than the angular velocity of the trigger.

56. A firearm comprising:
a frame;
a hammer pivotally mounted on said frame for movement to a set cock position, a double action position, and a fired position;
a trigger pivotally mounted on said frame;
means to control the amount of rotation of said hammer by actuation of said trigger;
said control means permitting movement of said hammer by said trigger to its set cock position when in one of its positions and movement of said hammer by said trigger to its double action position when in the other of its positions;
a member movable relative to said frame and having a portion disposed on at least one side of the exterior of said firearm for grasping by the user;
said movable member connected to said control means to move said control means from one of its positions to the other of its positions;
resilient means constantly urging said movable member to a position to maintain said control means in one of its positions;
said movable member being movable against the force of said resilient means to move said control means to the other of its positions;
said hammer moving from said double action position to said fired position by continued actuation of said trigger;
and said hammer moving from said set cock position to said fired position by again actuating said trigger.

57. A firearm comprising:
a frame;
a hammer pivotally mounted on said frame for movement to a set cock position, a double action position, and a fired position;
a trigger pivotally mounted on said frame;
means to control the amount of rotation of said hammer by actuation of said trigger;
said control means permitting movement of said hammer by said trigger to its set cock position when in one of its positions and movement of said hammer by said trigger to its double action position when in the other of its positions;
a member movable relative to said frame and having a portion disposed on each side of the exterior of said firearm for grasping by the user;
said movable member connected to said control means to move said control means from one of its positions to the other of its positions;
resilient means constantly urging said movable member to a position to maintain said control means in one of its positions;
said movable member being movable against the force of said resilient means to move said control means to the other of its positions;
said hammer moving from said double action position to said fired position by continued actuation of said trigger;
and said hammer moving from said set cock position to said fired position by again actuating said trigger.

58. A firearm including:
a pivotally mounted hammer for movement to a set cock position, a fired position, and a rest position;
resilient means urging said hammer to its fired position;
a pivotally mounted trigger;
a pivotally mounted sear;
a pawl movable between an interposing position to form a connection between said trigger and said hammer when said trigger is actuated and a non-interposing position between said trigger and said hammer;
said trigger, said pawl, and said hammer forming a moving mechanism to rotate said hammer when said pawl is in its interposing position;
an unyielding stop engaging said moving mechanism to stop movement thereof whereby said hammer is positioned at its set cock position when said trigger is released;
said hammer being held in its set cock position by said sear;
said pawl being moved from its interposing position upon release of said trigger;
said sear being disengaged from said hammer by further actuation of said trigger after release of said trigger whereby said hammer urging means moves said hammer to its fired position;
and means to rebound said hammer to its rest position.

References Cited by the Examiner

UNITED STATES PATENTS

| | | | |
|---|---|---|---|
| 786,796 | 4/1905 | Cobb | 42—65 |
| 845,274 | 2/1907 | Stern | 42—65 |
| 887,784 | 5/1908 | Fyrberg | 42—67 X |
| 2,958,151 | 11/1960 | Sefried | 42—67 |
| 3,049,977 | 8/1962 | Reich | 42—65 X |
| 3,158,949 | 12/1964 | Freed | 42—65 |
| 3,163,951 | 1/1965 | Lewis | 42—65 |

BENJAMIN A. BORCHELT, *Primary Examiner.*